(12) United States Patent
Shigematsu et al.

(10) Patent No.: US 6,259,554 B1
(45) Date of Patent: Jul. 10, 2001

(54) OPTICAL AMPLIFIER REPEATER SYSTEM

(75) Inventors: Masayuki Shigematsu; Masayuki Nishimura, both of Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/402,063

(22) PCT Filed: Jun. 18, 1999

(86) PCT No.: PCT/JP99/03261

§ 371 Date: Sep. 28, 1999

§ 102(e) Date: Sep. 28, 1999

(87) PCT Pub. No.: WO00/01081

PCT Pub. Date: Jan. 6, 2000

(30) Foreign Application Priority Data

Jun. 26, 1998 (JP) ................................. 10-180836

(51) Int. Cl.[7] ......................................................... H01S 3/00
(52) U.S. Cl. ............................ 359/337; 359/341; 359/177
(58) Field of Search ................................. 359/341, 177, 359/337

(56) References Cited

U.S. PATENT DOCUMENTS

| | | |
|---|---|---|
| 5,278,686 | 1/1994 | Grasso et al. . |
| 5,355,250 | 10/1994 | Grasso et al. . |
| 5,481,390 * | 1/1996 | Naito ...................................... 359/174 |
| 5,875,054 * | 2/1999 | Onoda et al. ........................... 359/341 |
| 6,134,032 * | 10/2000 | Kram et al. ............................ 359/110 |
| 6,151,148 * | 11/2000 | Harano ................................... 359/174 |

FOREIGN PATENT DOCUMENTS

| | | |
|---|---|---|
| 0 903 875 | 3/1999 | (EP) . |
| 62-245826 | 10/1987 | (JP) . |
| 4-324335 | 11/1992 | (JP) . |
| 5-292083 | 11/1993 | (JP) . |
| 7-143078 | 6/1995 | (JP) . |

\* cited by examiner

*Primary Examiner*—Mark Hellner
(74) *Attorney, Agent, or Firm*—McDermott, Will & Emery

(57) ABSTRACT

A repeater station 10 detects whether or not an abnormality exists in each of signal light and monitor light having arrived from a terminal station 1 or a repeater station 20, and controls, according to the result of detection, operations of optical amplifiers 11 and 12 and the monitor light. In the case where both of the signal light and monitor light arriving from the terminal station 1 via the optical transmission line for the downstream direction are abnormal, the optical amplifier 11 for the downstream direction stops its amplifying operation by itself, whereas a monitor control apparatus 13 stops the amplifying operation of the other optical amplifier for the upstream direction and also stops transmitting the monitor light to the terminal station 1 in the upstream direction.

10 Claims, 28 Drawing Sheets

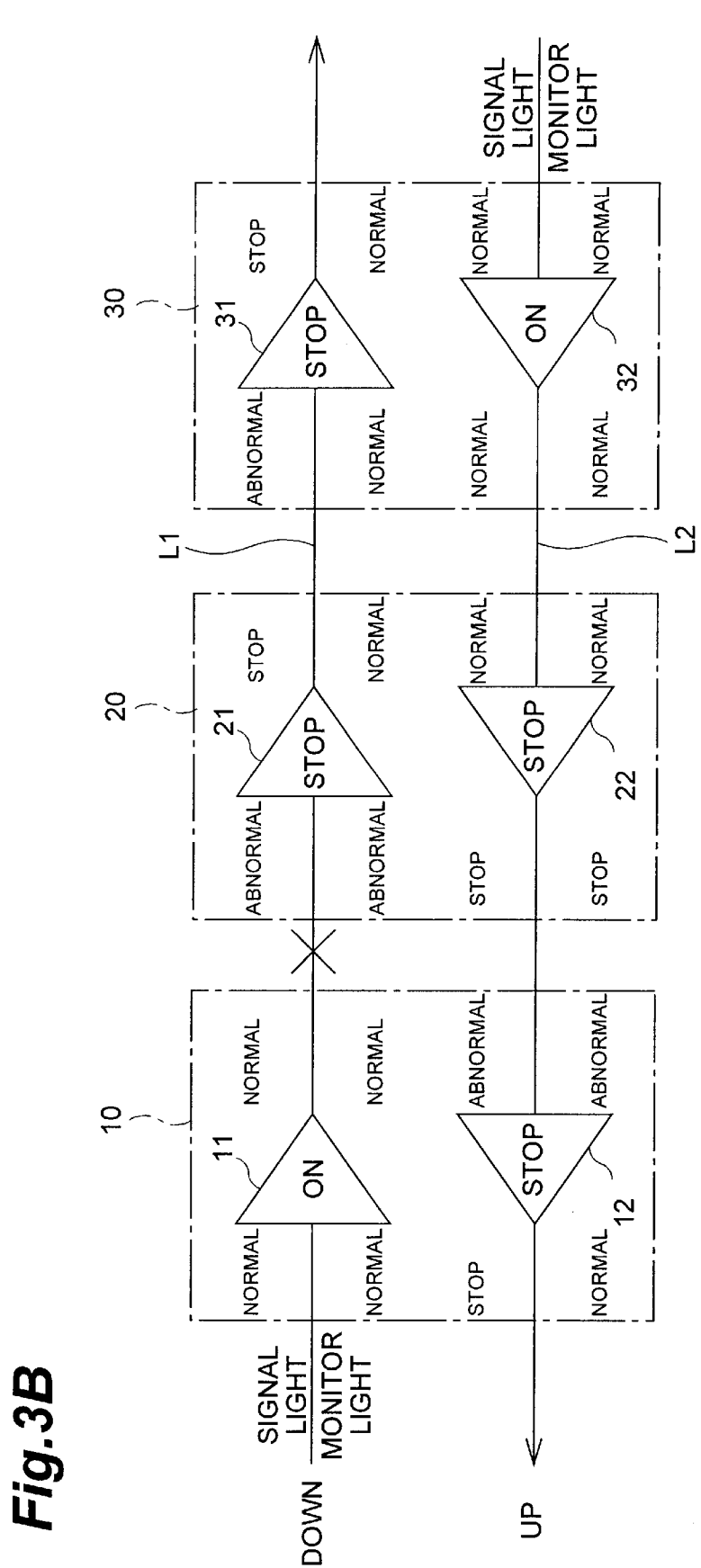

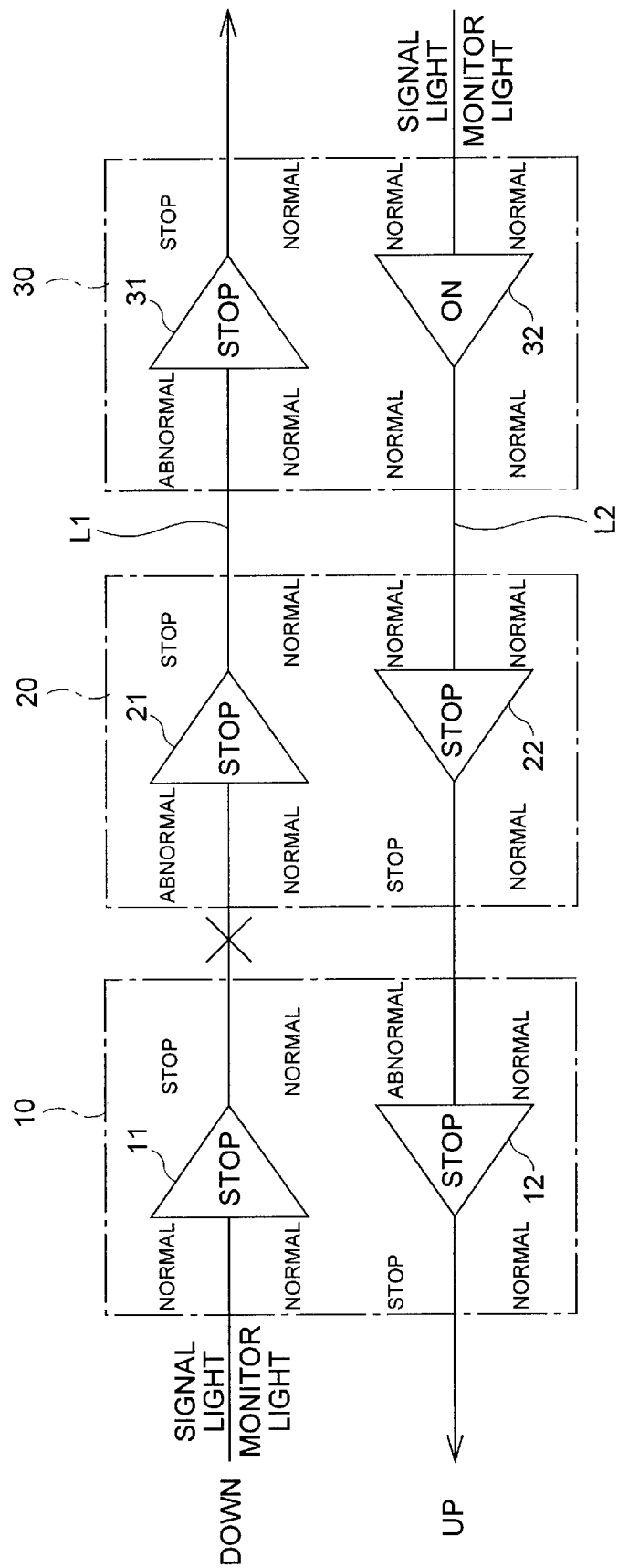

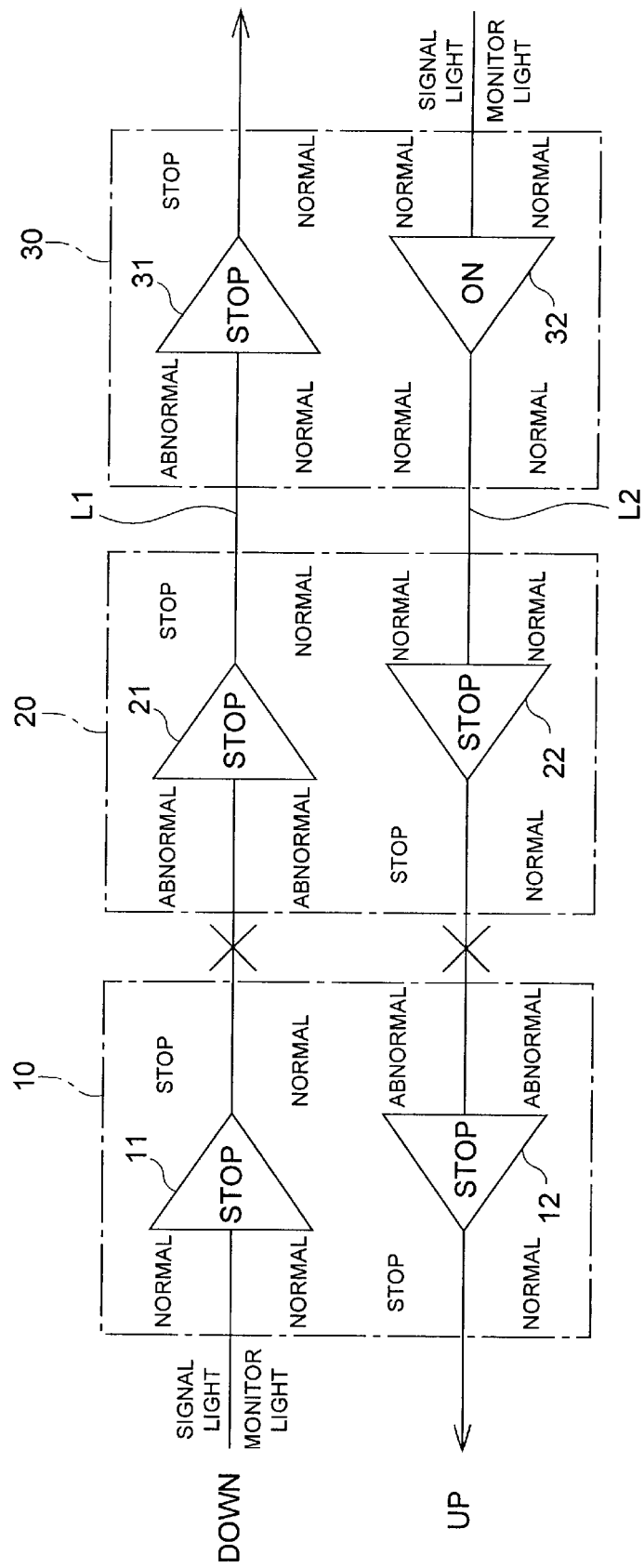

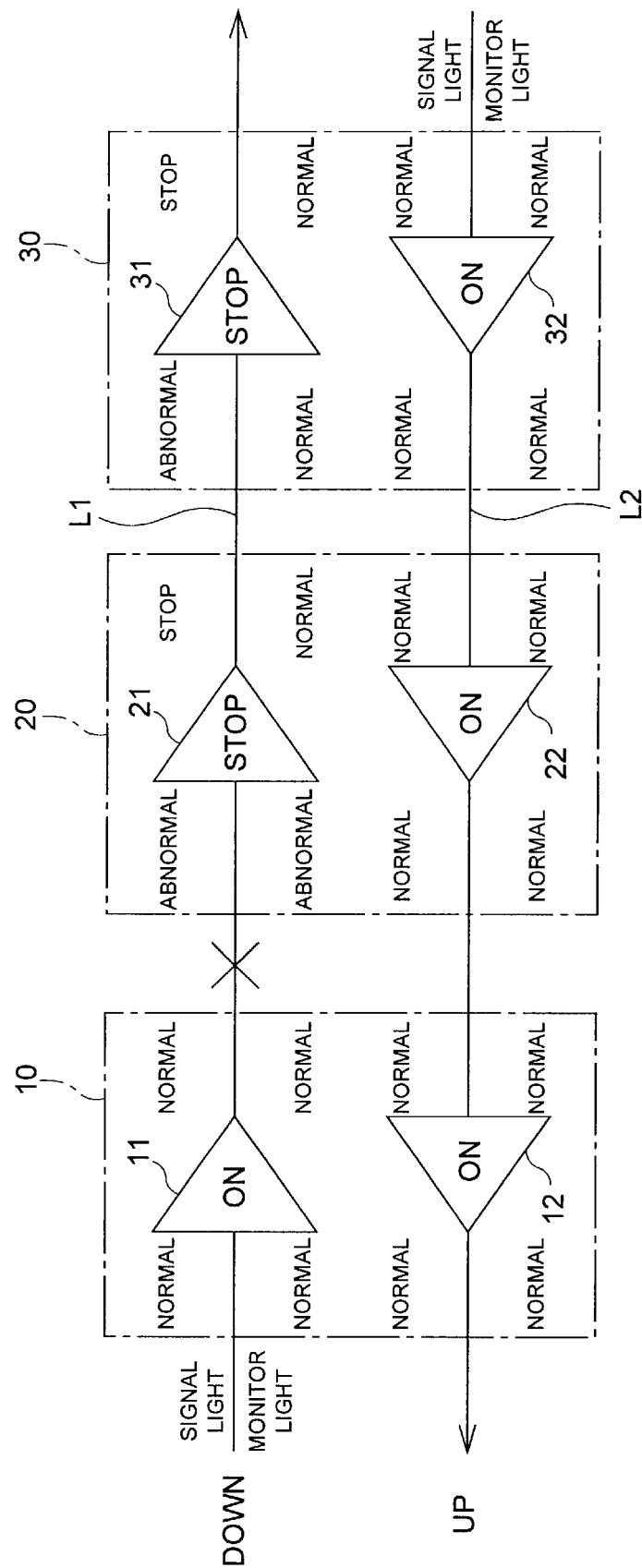

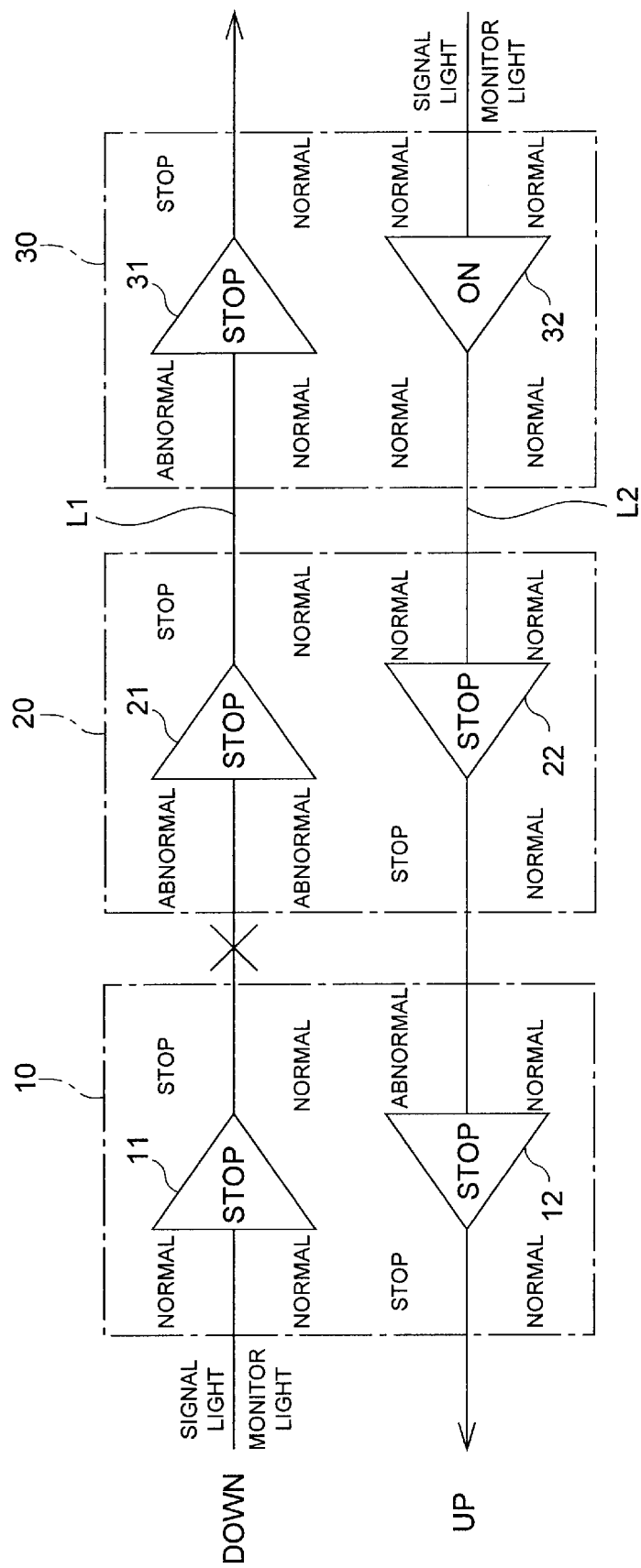

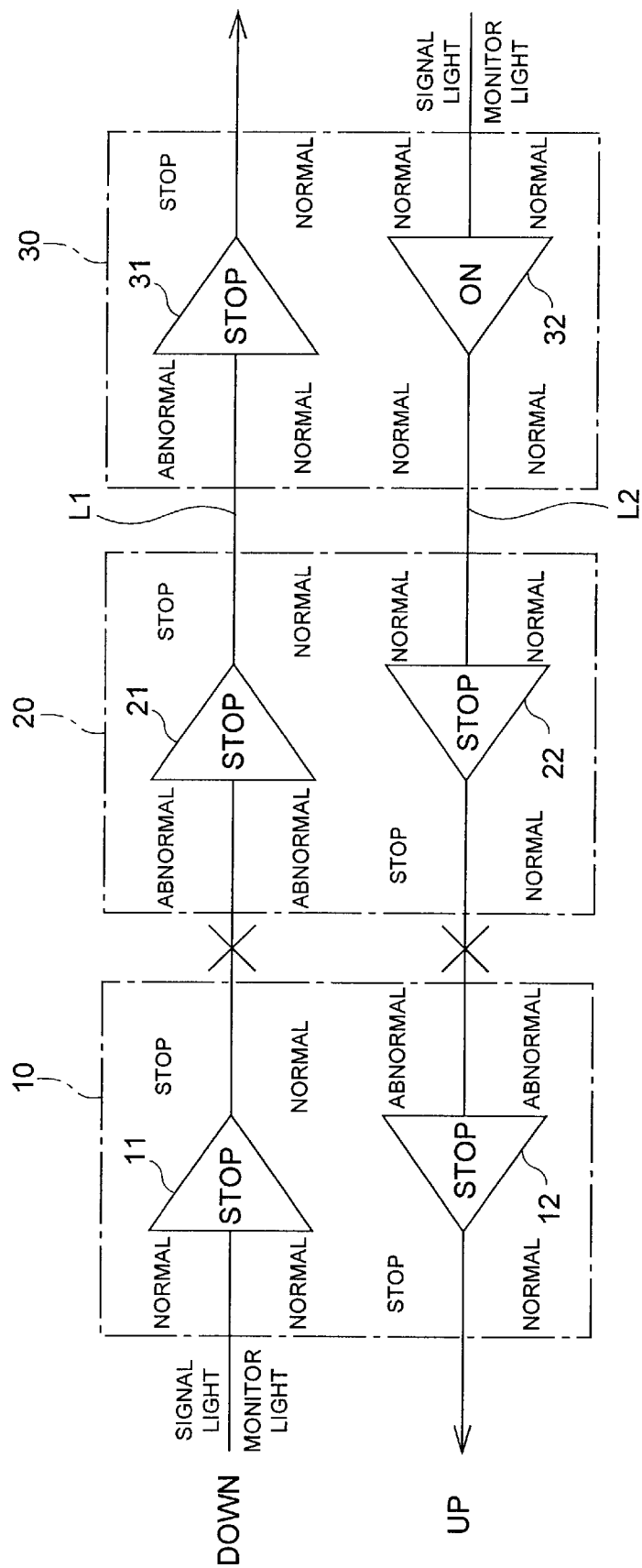

OPTICAL AMPLIFIER REPEATER SYSTEM

DESCRIPTION

1. Technical Field

The present invention relates to an optical amplifier repeater system which carries out bidirectional optical amplification and repeating of signal light by use of a plurality of repeater stations connected to each other in a multistage fashion.

2. Background Art

Employed for carrying out long-distance transmission in optical communications systems is a technique in which a plurality of repeater stations are connected to each other in a multistage fashion, while each repeater station is provided with an optical amplifier for amplifying the signal light transmitted thereto. In the case where an abnormality such as a break occurs at any location on an optical transmission line in such an optical amplifier repeater system, it is necessary to take steps to stop the operation of the optical amplifiers and remove the abnormality. To this end, it is required that the position where the abnormality has occurred be specified correctly.

Known as techniques for sensing abnormalities in optical amplifier repeater systems are those disclosed in Japanese Patent Application Laid-Open No. Hei 5-130043 and Japanese Patent Application Laid-Open No. Hei 4-324335.

In the optical amplifier repeater system in the former publication, whether signal light has reached an optical amplifier or not is detected, so as to sense abnormalities in its optical transmission line and the like, and the operation of the optical amplifier is stopped if the signal light has not reached there. In the latter optical amplifier repeater system, on the other hand, while the reflected return light of the signal light outputted from an optical amplifier is being monitored, if the quantity of reflected return light is large, then it is determined that the optical transmission line is abnormal, so that the operation of the optical amplifier is stopped.

In the former, while the operations of the repeater stations located downstream from the break point of the optical transmission line are stopped, abnormalities of such a degree that no break is generated thereby cannot be detected.

In the latter, on the other hand, the operations of the repeater stations located upstream from the break point of the optical transmission line are stopped. When the distance from an optical amplifier to the break point is long, reflected return light with a sufficient intensity may not go back to the optical amplifier, whereby it may not be able to detect an abnormality even though there is a break in the optical transmission line.

DISCLOSURE OF THE INVENTION

In view of these problems, it is an object of the present invention to provide an optical amplifier repeater system which can reliably detect abnormalities such as breaks in optical transmission lines and the like.

In order to solve the above-mentioned object, the optical amplifier repeater system in accordance with the present invention is an optical amplifier repeater system comprising a pair of transmission lines and a plurality of repeater stations connected to each other in a multistage fashion, so as to bidirectionally transmit signal light between terminal stations, wherein each of the plurality of repeater stations comprises a pair of optical amplifiers for amplifying the signal light being transmitted, and a monitor apparatus for monitoring a state of the signal light fed into each optical amplifier and stopping, when the signal light fed into one optical amplifier is abnormal, an operation of the optical amplifier and then, after a lapse of a predetermined time, stopping an operation of the other optical amplifier.

In this optical amplifier repeater system, since the state of signal light is monitored, abnormalities are reliably detected in each repeater station, the operation of its optical amplifier is automatically stopped, and then the operation of the optical amplifier on the transmission line for the opposite direction is also stopped, so that the signal light amplification is stopped on the transmission lines for both directions. Since the signal light intensity sent downstream via each transmission line is lowered, the operations of optical amplifiers are similarly stopped in the downstream repeater stations as well. As a consequence, information about occurrence of an abnormality can reliably be transmitted upstream of the location where the abnormality has occurred. Finally, the information about occurrence of the abnormality is reliably transmitted to a terminal station, whereby the transmission of signal light can be stopped.

In the optical repeater system in accordance with the present invention, each of the plurality of repeater stations is provided with a pair of optical amplifiers and a monitor apparatus; the monitor apparatus having a pair of monitor light receivers each receiving predetermined monitor light transmitted from an upstream adjacent repeater station or terminal station, and a pair of monitor light transmitters each adding predetermined information to the monitor light received by the monitor light receivers and transmitting the resulting light to a downstream adjacent repeater station or terminal station; the monitor apparatus monitoring states of the signal light and monitor light transmitted through each of the transmission lines and adding, when both of the signal light and monitor light transmitted through at least one of the transmission lines are abnormal, information indicative of an abnormal condition to the monitor light transmitted to the downstream side of both of the transmission lines.

In this optical amplifier repeater system, both of the signal light and monitor light transmitted through each transmission line are monitored at the repeater stations. If an abnormality occurs in the transmission line, then both of the signal light and monitor light exhibit a transmission failure. Since an abnormality occurs in only one of the signal light and monitor light due to the other causes, e.g., due to an abnormality in an optical amplifier in an upstream repeater station or an abnormality in the monitor light transmitter, abnormalities in the transmission lines can be solely distinguished therefrom, so as to be determined accurately. In case of an abnormality in a transmission line, its information is added to the monitor light and is transmitted to a downstream repeater station. In the downstream repeater station, information about the opposite transmission line is added to the monitor light transmitted from its upstream repeater station, and the resulting light is outputted therefrom. Each terminal station can obtain information about the abnormality in the transmission line.

In the case where both of the signal light and monitor light fed into one of the optical amplifiers are abnormal, the monitor apparatus stops the operation of this optical amplifier, then stops the operation of the other optical amplifier after a lapse of a predetermined time, and causes the monitor light outputted to the transmission line opposite to the transmission line in which the abnormality has occurred to be set to a state where the monitor apparatus in the downstream repeater station determines that the monitor light is abnormal.

In such a configuration, the signal light amplification in both transmission lines can automatically be stopped when an abnormality is detected in a transmission line. For example, if an optical connector of the unbroken one of the transmission lines is removed therefrom by any chance, high-output signal light can be prevented from unnecessarily emitting from the detached portion, whereby safety in operations can be improved.

Preferably, after a lapse of a predetermined time since the monitor light has been set to a state where the monitor apparatus in the downstream repeater station determines that the monitor light is abnormal, the monitor apparatus returns the monitor light to a state where the monitor apparatus in the downstream repeater station determines that the monitor light is normal. As a consequence, the transmission of information by the monitor light is established even after the signal light is interrupted.

In the case where both of the signal light and monitor light transmitted through one of the transmission lines are abnormal, the monitor apparatus stops the operation of the optical amplifier connected to this transmission line and then stops the operation of the other optical amplifier after a lapse of a predetermined time. It adds information capable of specifying the optical amplifier in which abnormal signal light is fed to the monitor light outputted to the transmission line opposite to the transmission line in which the abnormality has occurred, and transmits the resulting light. The monitor apparatus of a repeater station or terminal station having received the information-added monitor light signal stops the operation of the optical amplifier connected to the upstream side of the point where the abnormality has occurred.

In such a configuration, abnormalities in optical transmission lines can also be detected reliably, so as to stop the bidirectional optical transmission. Even in the case where an optical connector is removed by any chance from a transmission line in which no abnormalities occur, high-output signal light can be prevented from unnecessarily emitting from the detached portion, whereby safety in operations can be enhanced.

Further, when the monitor light returns to normal in the transmission line through which abnormal signal light is transmitted, the monitor apparatus causes the optical amplifier connected to the transmission line pairing with the former transmission line to resume its operation. Further, it is preferred that information for restoring the operation of an optical amplifier located upstream from the point where the abnormality has occurred be added to and transmitted with the monitor light outputted to the pairing transmission line.

In this configuration, when an optical transmission line is restored, optical transmission in both transmission lines can automatically be restored without any particular maneuvers.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 3A to 3E are views for successively explaining operations of the optical amplifier repeater system in the above-mentioned embodiment in the case where only the transmission line for one direction is broken;

FIGS. 5A to 5D are views for successively explaining operations of the optical amplifier repeater system in the above-mentioned embodiment in the case where the transmission lines for both directions are broken;

FIGS. 7A to 7C are views for successively explaining other operations of the optical amplifier repeater system in the above-mentioned embodiment in the case where only the transmission line for one direction is broken, whereas FIGS. 9A and 9B are views for successively explaining other operations of the optical amplifier repeater system in the above-mentioned embodiment in the case where the transmission lines for both directions are broken, whereas

BEST MODES FOR CARRYING OUT THE INVENTION

Figure 1:
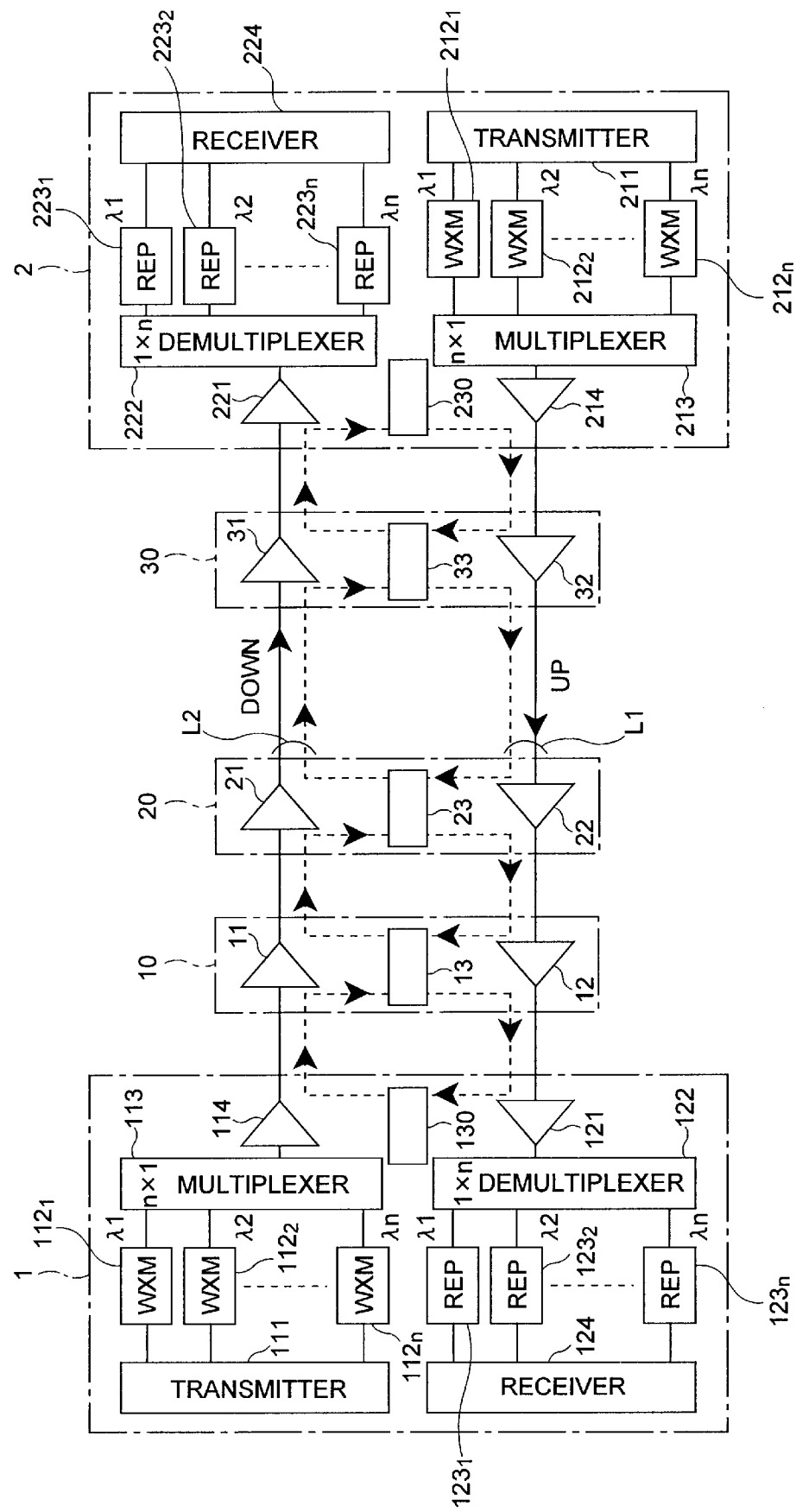
FIG. 1 is a configurational view of a preferred embodiment of the optical amplifier repeater system in accordance with the present invention.

In the following, preferred embodiments of the present invention will be explained in detail with reference to the accompanying drawings. For easier understanding of the explanation, constituents identical to each other among the drawings will be referred to with reference numerals identical to each other whenever possible, without their overlapping descriptions repeated.

FIG. 1 is a configurational view of the optical amplifier repeater system in accordance with the present invention. This optical amplifier repeater system transmits signal light bidirectionally between a terminal station 1 and a terminal station 2, whereas repeater stations 10, 20, and 30 are disposed on an optical transmission line between the terminal station 1 and the terminal station 2. The optical transmission line is constituted, for example, by an optical fiber, and comprises a transmission line L1 for the direction (hereinafter referred to as "downstream direction") from the terminal station 1 to the terminal stations 2 and a transmission line L2 for the opposite direction (hereinafter referred to as "upstream direction"). Though the following explanation relates to an optical amplifier repeater system carrying out wavelength-division multiplexing optical transmission, this embodiment is also applicable to the optical amplifier repeater system in the case where it carries out single-wave transmission.

The terminal station 1 is constituted by n wavelength converter transmitters (WXMs) $112_1$ to $112_n$, a multiplexer section 113, an optical amplifier 114, an optical amplifier 121, a demultiplexer 122, n repeaters (REPs) $123_1$ to $123_n$, a receiver 124, and a monitor control apparatus 130.

The transmitter 111 outputs n electric signals to be transmitted to the terminal station 2 on the other end. In response to the n electric signals, the WXMs $112_1$ to $112_n$ generate different wavelengths λ1 to λn of signal light, respectively. The multiplexer section 113 multiplexes the n waves of signal light outputted from the respective WXMs $112_1$ to $112_n$. The optical amplifier 114 optically amplifies the multi-wavelength light outputted from the multiplexer section 113, and sends out thus amplified light toward the terminal station 2.

On the other hand, the optical amplifier 121 optically amplifies the multi-wavelength signal light having arrived from the terminal station 2. The demultiplexer 122 demultiplexes the multi-wavelength signal light outputted from the optical amplifier 121 into signal light components having respective wavelengths λ1 to λn. The REPs $123_1$ to $123_n$ receive their corresponding signal light components, convert them into predetermined electric signals, and send out the resulting signals to the receiver 124.

The monitor control apparatus 130 receives a monitor light signal outputted from the monitor control apparatus 13 in the repeater station 10 and transmits the monitor light signal to the monitor control apparatus 13 in the repeater station 10.

The terminal station 2 has a configuration similar to that of the terminal station 1, and comprises a transmitter 211, nWXMs $212_1$ to $212_n$, a multiplexer section 213, an optical amplifier 214, an optical amplifier 221, a demultiplexer 222, nREPs $223_1$ to $223_n$, a receiver 224, and a monitor control apparatus 230.

The repeater station 10 comprises a pair of optical amplifiers 11, 12 and the monitor control apparatus 13. Each of the repeater stations 20, 30 comprises a pair of optical amplifiers 21, 22 or 31, 32 and a monitor control apparatus 23 or 33.

The optical amplifiers 11, 21, and 31 are linked to each other substantially in series via the transmission line L1. The optical amplifiers 32, 22, and 12 are linked to each other substantially in series via the transmission line L2.

Though the signal light sent out from the terminal station 1 lowers its intensity while being transmitted through the transmission line L1, it is amplified by the optical amplifiers 11, 21, and 31 in the repeater stations 10, 20, 30 on its way, so as to reach the terminal station 2 with a sufficient intensity. Similarly, the signal light sent out from the terminal station 2 is amplified by the optical amplifiers 32, 22, and 12, so as to reach the terminal station 1 with a sufficient intensity.

Figure 2:
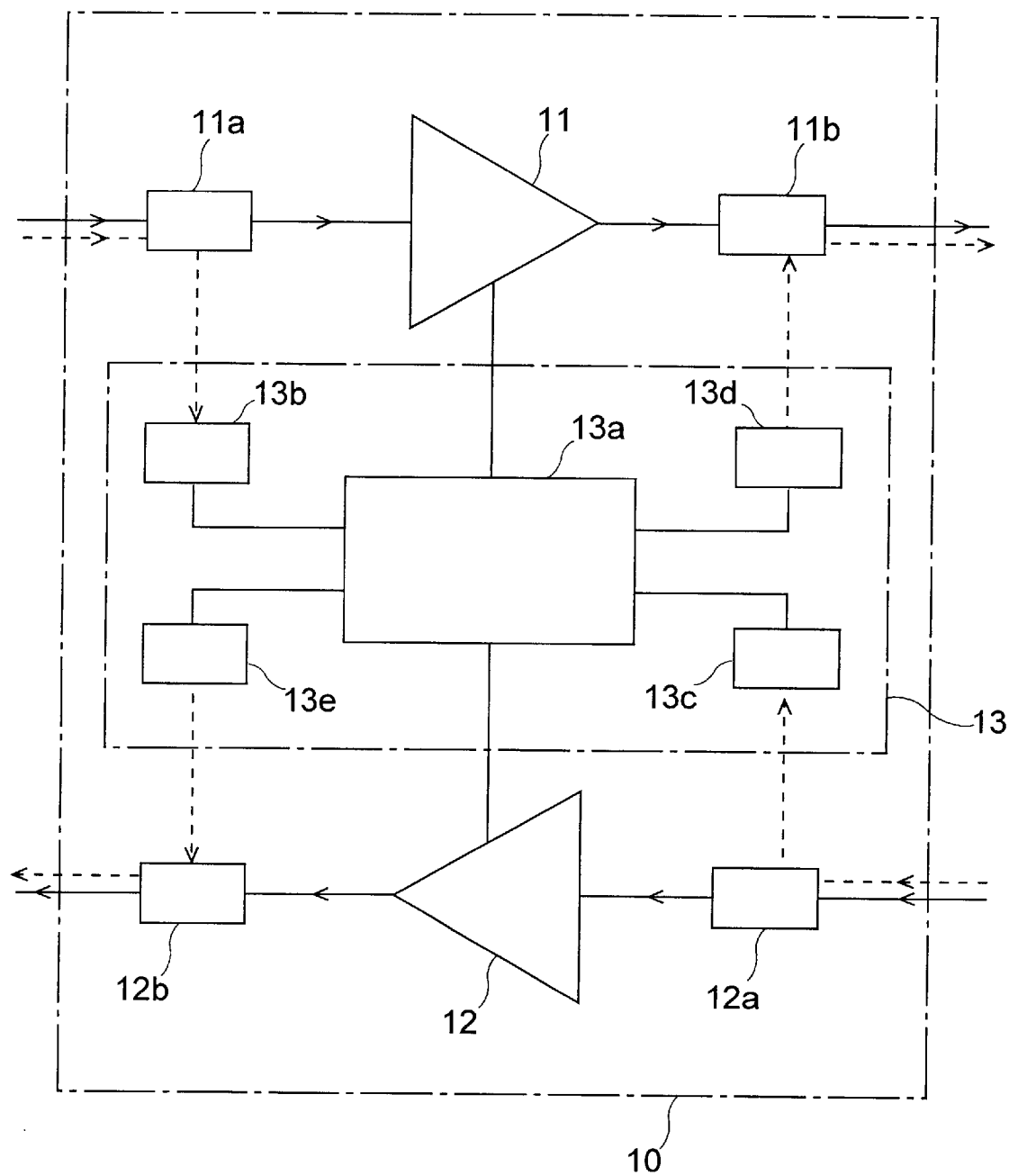
FIG. 2 is a block diagram of the inside of the monitor apparatus in each repeater station in the apparatus of FIG. 1.

FIG. 2 is a block diagram showing the inner configuration of the repeater station 10 in further detail, and the repeater stations 20, 30 have the same configuration.

Demultiplexer devices 11a, 12a for demultiplexing the signal light and the monitor light from each other are disposed on the input side of the respective optical amplifiers 11, 12, whereas multiplexer devices 11b, 12b for multiplexing the signal light and the monitor light together are disposed on the output side thereof. On the other hand, the monitor control apparatus 13 comprises a monitor control section 13a, a pair of monitor light receivers 13b, 13c, and a pair of monitor light transmitters 13d, 13e.

The monitor control section 13a adds information concerning the repeater station 10 and the transmission line to the monitor light signal received by the monitor light receivers 13b, 13c, and causes the resulting signal to be transmitted from the monitor light transmitters 13d, 13e. In the optical amplifier repeater system shown in FIG. 1, monitor data are transmitted from the monitor control apparatus 130 in the terminal station 1 to the monitor control apparatus 230 in the terminal station 2 through the transmission line L1 by way of the monitor control apparatus 13 in the repeater station 10, the monitor control apparatus 23 in the repeater station 20, and the monitor control apparatus 33 in the repeater station 30. On the other hand, monitor data are transmitted from the monitor control apparatus 230 in the terminal station 2 to the monitor control apparatus 130 in the terminal station 1 through the transmission line L2 by way of the monitor control apparatus 33 in the repeater station 30, the monitor control apparatus 23 in the repeater station 20, and the monitor control apparatus 13 in the repeater station 10. Thus the monitor data are finally collected in the terminal stations at both ends. A wavelength different from that of the signal light is used for the monitor light.

Also, the optical amplifiers 11, 12 function to detect whether or not an abnormality exists in the signal light arriving there, and transmit the result of detection to the monitor control section 13a. The monitor control section 13a also functions to control the operation of each constituent in the repeater station 10.

Specifically, the monitor control apparatus 13 detects abnormalities in the monitor light received by the monitor light receivers 13b, 13c and, in response to the results of abnormality detection by the optical amplifiers 11 and 12, controls the optically-amplifying operations and monitor light transmission of the optical amplifiers 11 and 12. Table 1 shows relationships between the results of detection and control operations. In the following explanation, the optical amplifiers 11, 12 are assumed to automatically stop their amplifying operations when an abnormality occurs in the signal light fed therein. The optical amplifiers 11, 12 may detect only abnormalities in signal light, with their amplifying operations being controlled by the monitor control section 13a. Abnormalities in signal light may be detected by devices different from the optical amplifiers 11, 12 as well. Though the state of transmission in the transmission line L1 is explained, the same also holds true in the state of transmission in the transmission line L2.

TABLE 1

Relationship between Detection Result and Control Operation

| Condition | Transmission line L1 | | Presumed cause | Operation of monitor control apparatus 13 | Operation of optical amplifier 11 | Operation of optical amplifier 12 |
|---|---|---|---|---|---|---|
| | Signal light state | Monitor light state | | | | |
| 1 | normal | normal | normal | hold | hold | hold |
| 2 | normal | abnormal | monitor control apparatus failure, etc. | hold | hold | hold |
| 3 | abnormal | normal | WXM failure, etc. | hold | stop | hold |

TABLE 1-continued

Relationship between Detection Result and Control Operation

| Condition | Transmission line L1 | | | Operation of monitor control apparatus 13 | Operation of optical amplifier 11 | Operation of optical amplifier 12 |
| --- | --- | --- | --- | --- | --- | --- |
| | Signal light state | Monitor light state | Presumed cause | | | |
| 4 | abnormal | abnormal | transmission line break | upstream stop | stop | stop |

Whether normal or abnormal is determined by, for example, comparing the intensities of the signal light and monitor light with their predetermined thresholds, so that the level at each threshold or higher and the level lower than the threshold are determined to be normal and abnormal, respectively.

As indicated in the column of Condition 1, in the case where both of the signal light and monitor light arriving from the terminal station 1 via the optical transmission line L1 are normal, the optical amplifier 11 keeps its amplifying operation, whereas the monitor control apparatus 13 keeps its monitor light transmission. At the same time, the amplifying operation of the optical amplifier 12 is maintained.

As indicated in the column of Condition 2, in the case where the signal light arriving from the terminal station 1 via the optical transmission line L1 is normal while the monitor light is abnormal, a failure in the monitor control apparatus 130 in the terminal station 1 on the upstream side or the like is presumed to exist. There is no problem in the transmission of signal light from the terminal station 1 to the repeater station 10. As in Condition 1, the optical amplifier 11 keeps its amplifying operation, and the monitor control apparatus 13 keeps its monitor light transmission and also keeps the amplifying operation of the optical amplifier 12. In this case, the normal state of Condition 1 is automatically resumed when an operation for repairing the point of failure is carried out.

As indicated in the column of Condition 3, in the case where the signal light arriving from the terminal station 1 through the optical transmission line L1 is abnormal while the monitor light is normal, a failure in the WXMs 112₁ to 112ₙ or optical amplifier 114 in the terminal station 1 on the upstream side is presumed to exist. Since the monitor light is transmitted normally, it can be seen that the optical transmission line itself from the terminal station 1 to the repeater station 10 is not broken. Therefore, the optical amplifier 11 for the downstream direction stops its amplifying operation by itself, whereas the monitor control apparatus 13 keeps the amplifying operation of the other optical amplifier 12 and also keeps the monitor light transmission.

In this case, if the causes are resolved, then the normal state of Condition 1 will automatically be resumed.

As indicated in the column of Condition 4, in the case where both of the signal light and monitor light arriving from the terminal station 1 through the optical transmission line L1 are abnormal, it is presumed that the optical transmission line from the terminal station 1 to the repeater station 10 is broken. The optical amplifier 11 for the downstream direction stops its amplifying operation by itself, and notifies the monitor control apparatus 13 of this state. The monitor control apparatus 13 having received the notification stops the amplifying operation of the other optical amplifier 12 and also stops the transmission of monitor light to the terminal station 1.

Detecting whether or not abnormalities exist in both of signal light and monitor light makes it possible to reliably detect abnormalities in transmission lines regardless of the state of failure in other instruments. When the transmission/reception of monitor light is not effected, the control operations shown in Table 2 are carried out.

TABLE 2

Relationship between Detection Result and Control Operation

| Condition | Signal light state via transmission line L1 | Presumed cause | Operation of monitor control apparatus 13 | Operation of optical amplifier 11 | Operation of optical amplifier 12 |
| --- | --- | --- | --- | --- | --- |
| A | normal | normal | hold | hold | hold |
| B | abnormal | transmission line break | upstream stop | stop | stop |

As shown in the column of Condition A, in the case where the signal light arriving from the terminal station 1 through the optical transmission line L1 is normal, both of the optical amplifiers 11, 12 keep their amplifying operations. On the other hand, as shown in the column of Condition B in the case where the signal light arriving from the terminal station 1 through the optical transmission line L1 is abnormal, it is presumed that the optical transmission line L1 from the terminal station 1 to the repeater station 10 is broken. Hence, the optical amplifier 11 for the downstream direction stops its amplifying operation by itself, and notifies the monitor control apparatus 13 of this state. The monitor control apparatus 13 having received this notification stops the amplifying operation of the optical amplifier 12 for the upstream direction.

Here, the amplifying operations of the optical amplifiers 11 and 12 can be stopped by, for example, discontinuing their excitation light. On the other hand, the transmission of monitor light to the terminal station 1 in the upstream direction can be stopped when the monitor light transmitter 13e emitting monitor light is caused to stop emitting light. Also, monitor light for making it possible to sense that the monitor control apparatus 130 in the terminal station 1 is abnormal may be sent out.

The repeater station 10 carries out similar monitoring and controlling operations for the transmission line L2 for the upstream direction as well. Similar monitoring and controlling operations are also carried out in other repeater stations 20, 30.

Next, operations of this embodiment in the case where an optical transmission line is broken will be explained. Operations in the case where only the optical transmission line for one direction is broken will be explained with reference to FIGS. 3A to 3E. In these drawings, the operating state of each optical amplifier is indicated in the triangle representing the optical amplifier. The respective states of signal light are indicated on the input and output sides of each optical amplifier, whereas the respective states of monitor light are indicated therebelow.

Assumed here is the case where only the optical transmission line L1 for the downstream direction from the repeater station 10 to the repeater station 20 is broken at the point marked with X. Also, this optical amplifier repeater system is assumed to transmit and receive monitor light.

Figure 3A:
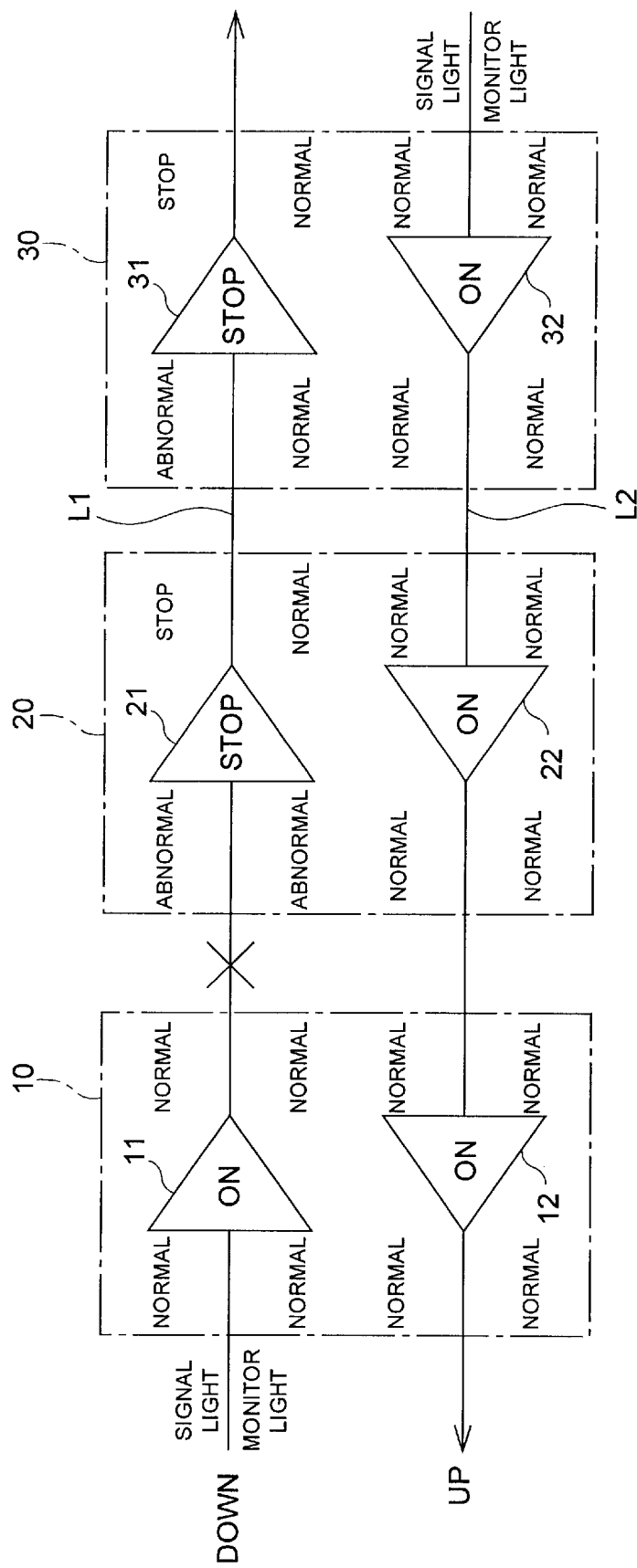

In this case, as shown in FIG. 3A, neither the signal light nor the monitor light reaches the repeater station 20 from the repeater station 10, whereby the transmission line L1 in the repeater station 20 falls under Condition 4 in Table 1. The optical amplifier 21 in the repeater station 20 senses that the signal light fed therein is abnormal, stops its amplifying operation by itself, and notifies the monitor control apparatus 23 of this state. As a consequence, the signal light does not reach the repeater station 30 from the repeater station 20, whereas the monitor light reaches there normally. The transmission line L1 in the repeater station 30 falls under Condition 3 in Table 1. Therefore, the optical amplifier 31 in the repeater station 30 senses that the signal light fed therein is abnormal, stops its amplifying operation by itself, and notifies the monitor control apparatus 33 of this state.

Also, as shown in FIG. 3B, the monitor control apparatus 23 in the repeater station 20 senses or is notified that both of the signal light and monitor light to arrive from the repeater station 10 are abnormal (fall under Condition 4 in Table 1), stops the amplifying operation of the optical amplifier 22, and stops transmitting the monitor light to the repeater station 10. As a consequence, neither the signal light nor the monitor light reaches the repeater station 10 from the repeater station 20, whereby the repeater station 10 falls under Condition 4 in Table 1.Therefore, the optical amplifier 12 in the repeater station 10 senses that the signal light fed therein is abnormal, stops its amplifying operation by itself, and notifies the monitor control apparatus 13 of this state.

Figure 3C:
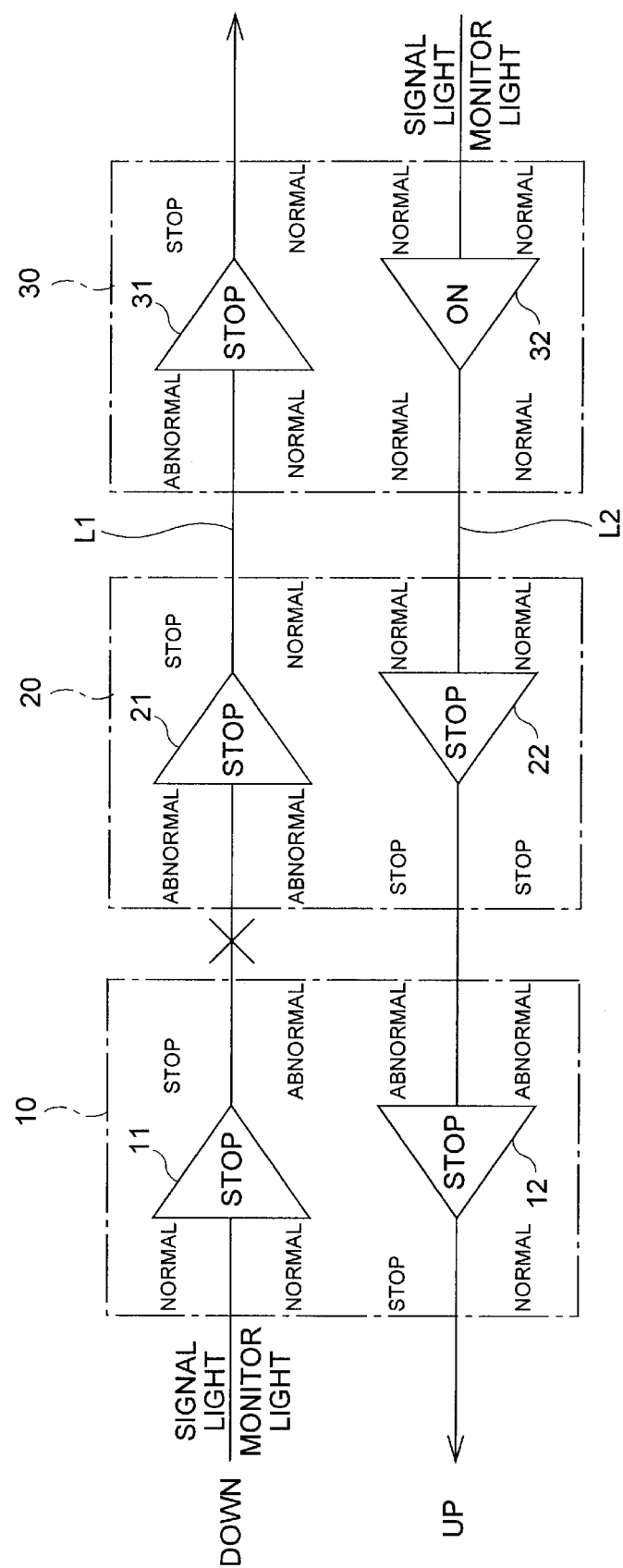

Consequently, as shown in FIG. 3C, the monitor control apparatus 13 in the repeater station 10 senses or is notified that both of the signal light and monitor light to arrive from the repeater station 10 are abnormal (fall under Condition 4 in Table 1), stops the amplifying operation of the optical amplifier 11, and stops transmitting the monitor light to the repeater station 20. Thus obtained is a state where neither the signal light nor the monitor light is transmitted through any of the optical transmission lines for the upstream and downstream directions between the repeater station 10 and the repeater station 20.

Figure 3D:
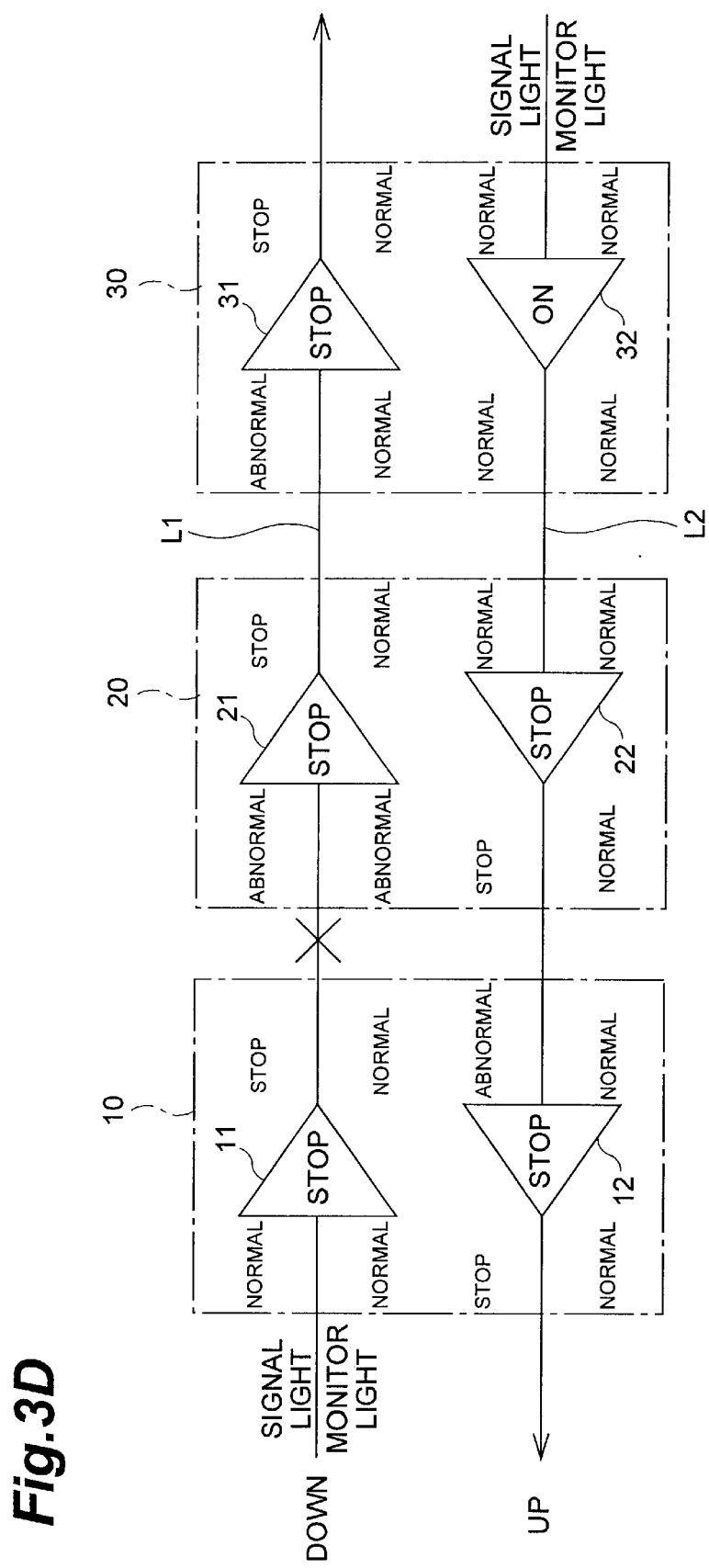

From this state, as shown in FIG. 3D, the monitor control apparatus 23 resumes transmitting the monitor light to the transmission line L2. The monitor light transmission function through the transmission line L2 is reestablished. In this state, since no signal light is transmitted through any transmission line, even in such a case where an operator has removed an optical connector upon the restoring operation, no high-output light beam would be emitted from the optical connector, whereby safety in operations would improve.

After the completion of the restoring operation, since the transmission of monitor light from the repeater station 10 to the repeater station 20 through the transmission line L1 for the downward direction is effected normally as shown in FIG. 3E, the monitor light transmission function through the transmission line L1 for the downstream direction is resumed as well. Thus, after it is confirmed that the monitor light transmission functions on both sides are established, a command from the terminal station 1 or 2 reactivates the optical amplifier 11, thereby allowing the transmission line to be restored in the optical amplifier repeater system.

Next, in the case where the optical amplifier repeater system neither transmits nor receives the monitor light, operations at the time when only the optical transmission line for one direction is broken will be explained with reference to FIGS. 4A to 4C.

Figure 4A:
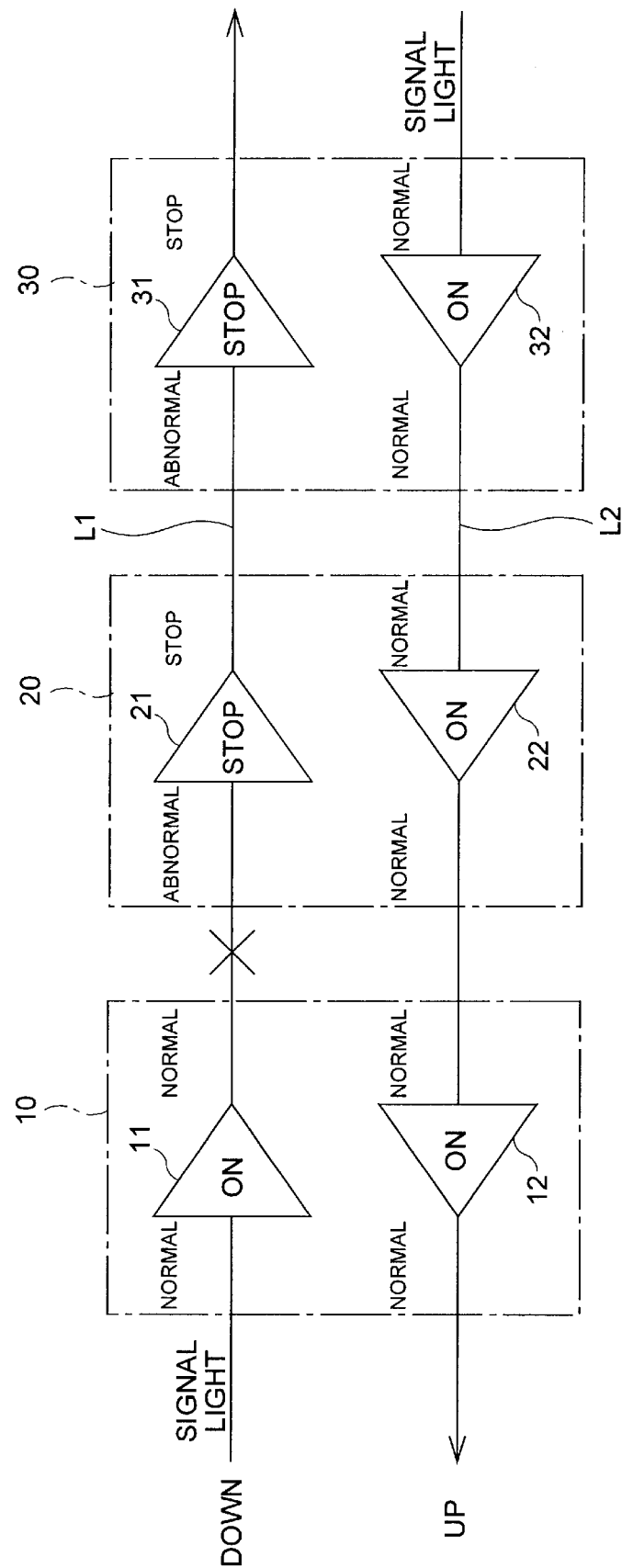
FIGS. 4A to 4C are views for successively explaining other operations of the optical amplifier repeater system in the above-mentioned embodiment in the case where only the transmission line for one direction is broken.

In this case, as shown in FIG. 4A, the signal light does not reach the repeater station 20 from the repeater station 10, whereby the repeater station 20 falls under Condition B in Table 2. Therefore, the optical amplifier 21 in the repeater station 20 senses that the signal light fed therein is abnormal, stops its amplifying operation by itself, and notifies the monitor control apparatus 23 of this state. As a consequence, no signal light reaches the repeater station 30 from the repeater station 20, whereby the repeater station 30 falls under Condition B in Table 2. Hence, the optical amplifier 31 in the repeater station 30 senses that the signal light fed therein is abnormal, stops its amplifying operation by itself, and notifies the monitor control apparatus 33 of this state.

Figure 4B:
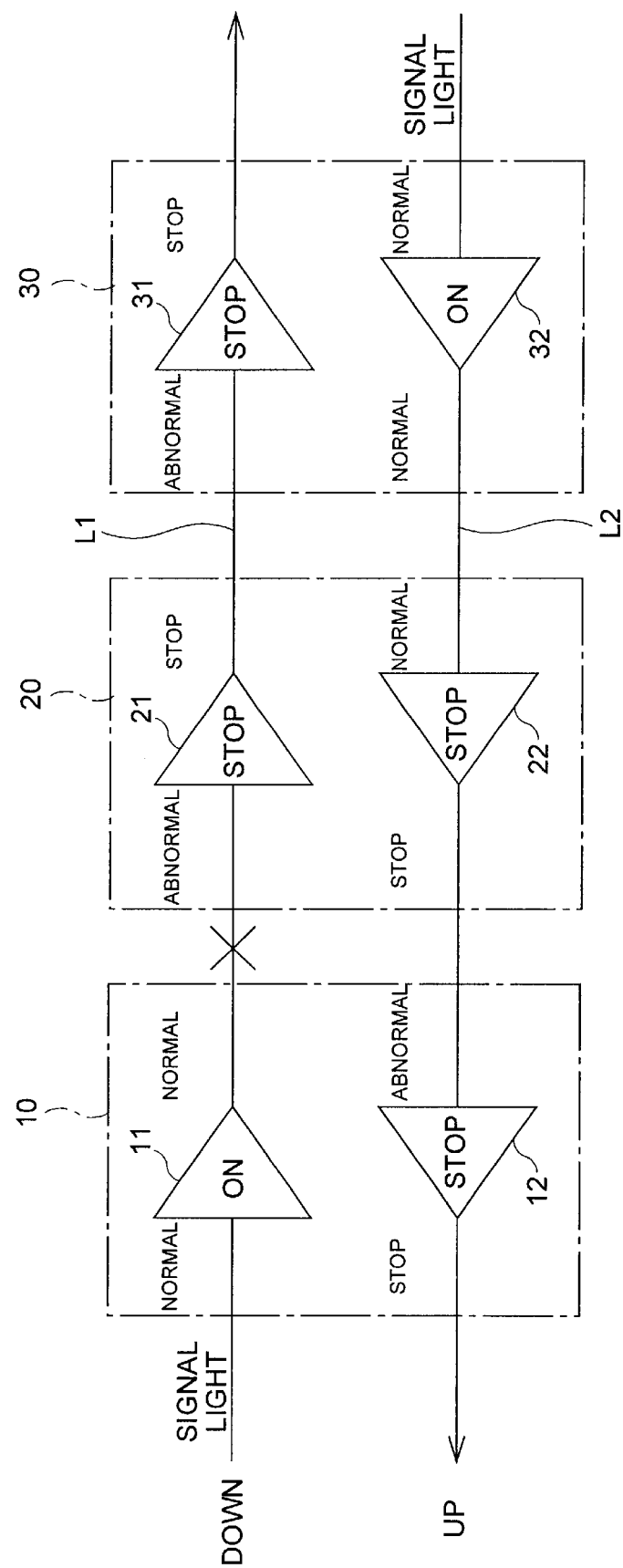

Also, as shown in FIG. 4B, the monitor control apparatus 23 in the repeater station 20 senses or is notified that the signal light to arrive from the repeater station 10 is abnormal (falls under Condition B in Table 2), and stops the amplifying operation of the optical amplifier 22. The signal light does not reach the repeater station 10 from the repeater station 20, whereby the repeater station 10 falls under Condition B in Table 2. The optical amplifier 12 in the repeater station 10 senses that the signal light fed therein is abnormal, stops its amplifying operation by itself, and notifies the monitor control apparatus 13 of this state.

Figure 4C:
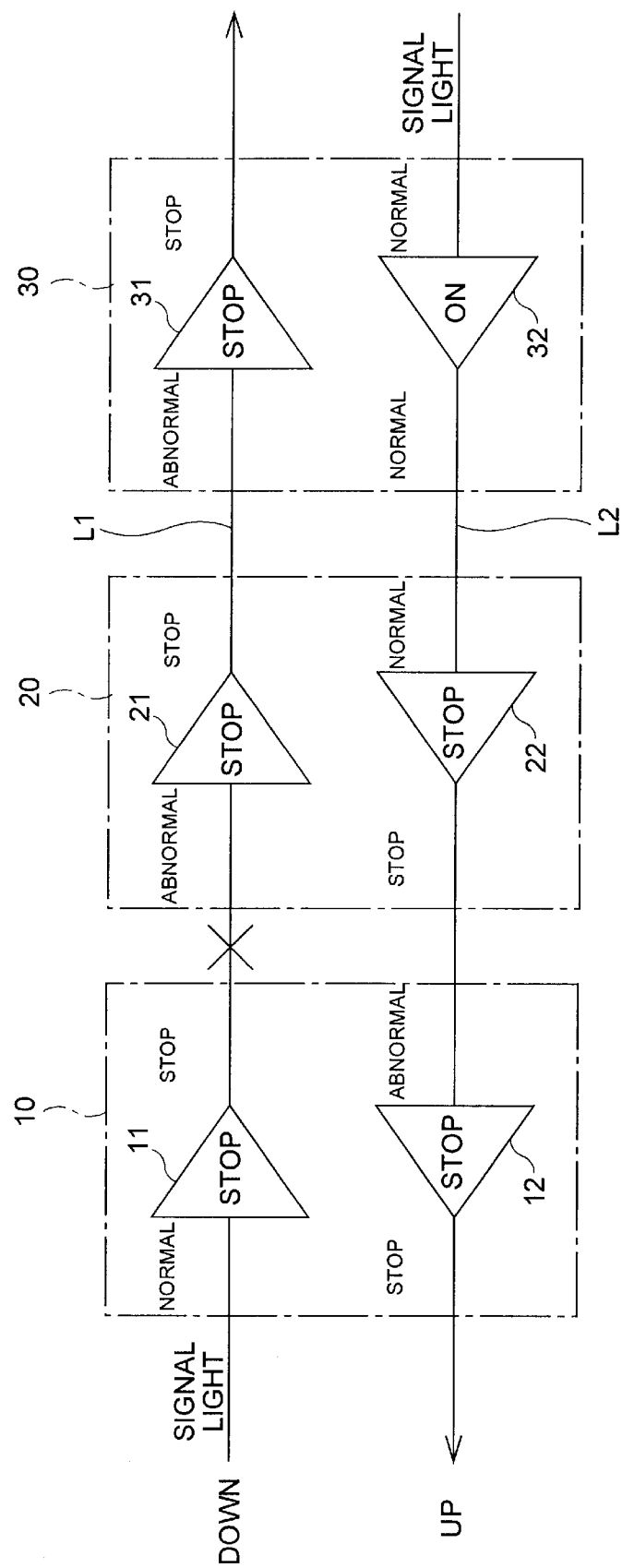

Then, as shown in FIG. 4C, the monitor control apparatus 13 in the repeater station 10 senses or is notified that the signal light to arrive from the repeater station 20 is abnormal (falls under Condition B in Table 2), and stops the amplifying operation of the optical amplifier 11. Thus obtained is a state where no signal light is transmitted through any of the optical transmission lines L1, L2 between the repeater station 10 and the repeater station 20. As a consequence, the safety of the operator upon the operation for restoring the optical transmission line is secured. After the problem is removed, it is necessary to confirm the restoration of the transmission line L1 and then manually restore the optical repeater amplifier system.

Next, operations in the case where optical transmission lines for both directions are broken will be explained with reference to FIGS. 5A to 5D. Assumed here is the case where both of the bidirectional optical transmission lines between the repeater station 10 and the repeater station 20 are broken at the points marked with X.

Figure 5A:
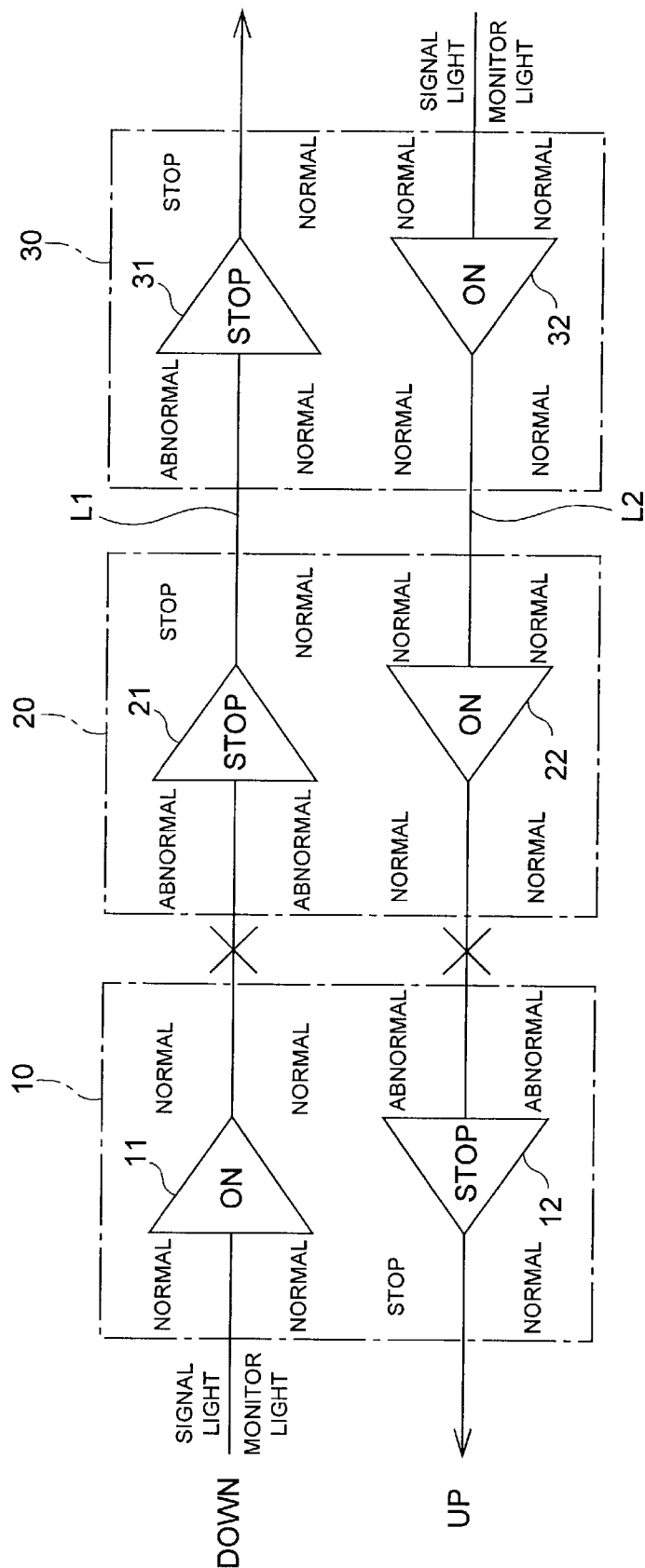

In this case, as shown in FIG. 5A, neither the signal light nor the monitor light reaches the repeater station 20 from the repeater station 10, whereby the repeater station 20 falls under Condition 4 in Table 1. Therefore, the optical amplifier 21 in the repeater station 20 senses that the signal light fed therein is abnormal, stops its amplifying operation by itself, and notifies the monitor control apparatus 23 of this state. As a consequence, the signal light does not reach the repeater station 30 from the repeater station 20, whereas the monitor light reaches there normally. The repeater station 30 falls under Condition 3 in Table 1. Hence, the optical amplifier 31 in the repeater station 30 senses that the signal light fed therein is abnormal, stops its amplifying operation by itself, and notifies the monitor control apparatus 33 of this state. Also, neither the signal light nor the monitor light reaches the repeater station 10 from the repeater station 20, whereby the repeater station 10 falls under Condition 4 in Table 1. Consequently, the optical amplifier 12 in the repeater station 10 senses that the signal light fed therein is abnormal, stops its amplifying operation by itself, and notifies the monitor control apparatus 13 of this state.

Figure 5B:
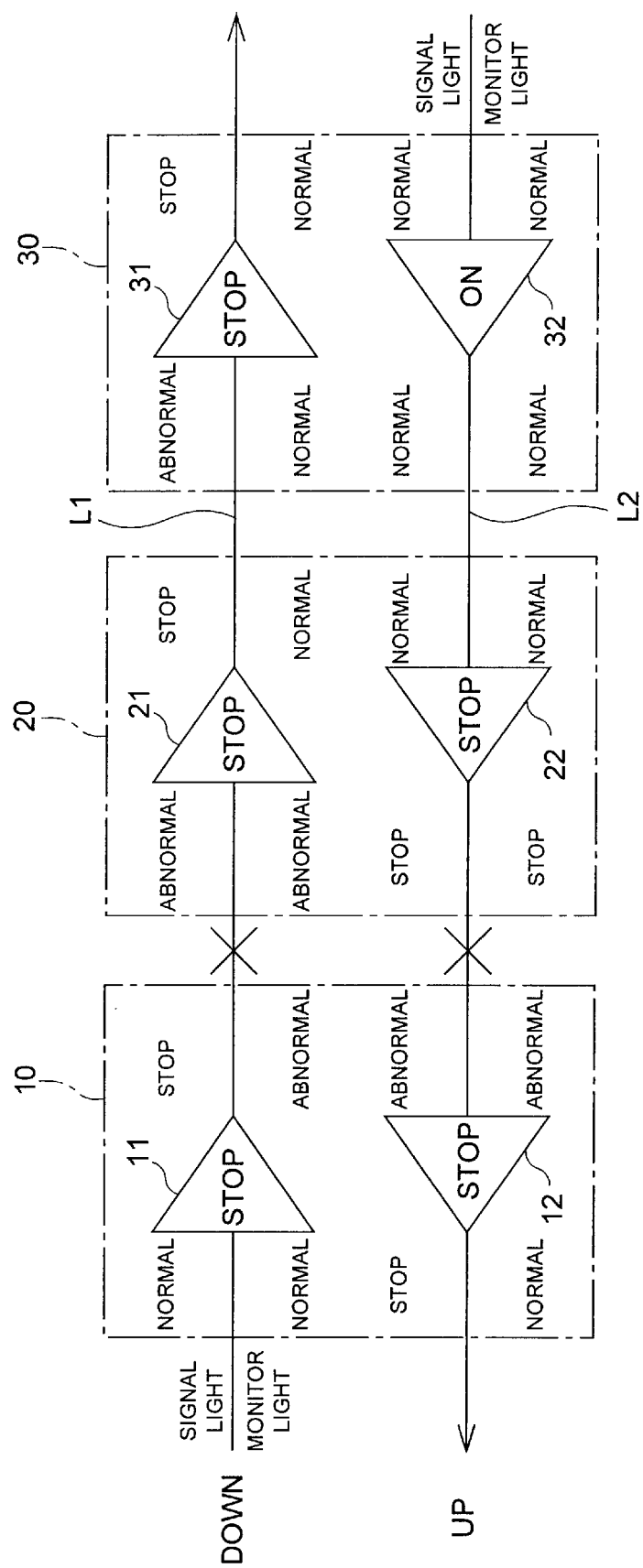

Then, as shown in FIG. 5B, the monitor control apparatus 23 in the repeater station 20 senses or is notified that both of the signal light and monitor light to arrive from the repeater station 10 are abnormal (fall under Condition 4 in Table 1), stops the amplifying operation of the optical amplifier 22, and also stops transmitting the monitor light to the repeater station 10. On the other hand, the monitor control apparatus 13 in the repeater station 10 senses or is notified that both of the signal light and monitor light to arrive from the repeater station 20 are abnormal (fall under Condition 4 in Table 1), stops the amplifying operation of the optical amplifier 11, and also stops transmitting the monitor light to the repeater station 20 in the downstream direction. Thus obtained is the state where neither the signal light nor the monitor light is transmitted through any of the optical transmission lines L1, L2 between the repeater station 10 and the repeater station 20, whereby the transmission states of the monitor light and signal light at this time become identical to those in FIG. 3C.

From this state, as shown in FIG. 5C, the monitor control apparatus 23 resumes transmitting the monitor light to the transmission line L2 for the upstream direction. On the other hand, the monitor control apparatus 13 resumes transmitting the monitor light to the transmission line L1 for the downstream direction. In this state, since no signal light is transmitted through any of the transmission lines, even in such a case where an operator has removed an optical connector upon the restoring operation, no high-output light beam would be emitted from the optical connector, whereby safety in operations would improve.

Figure 5D:
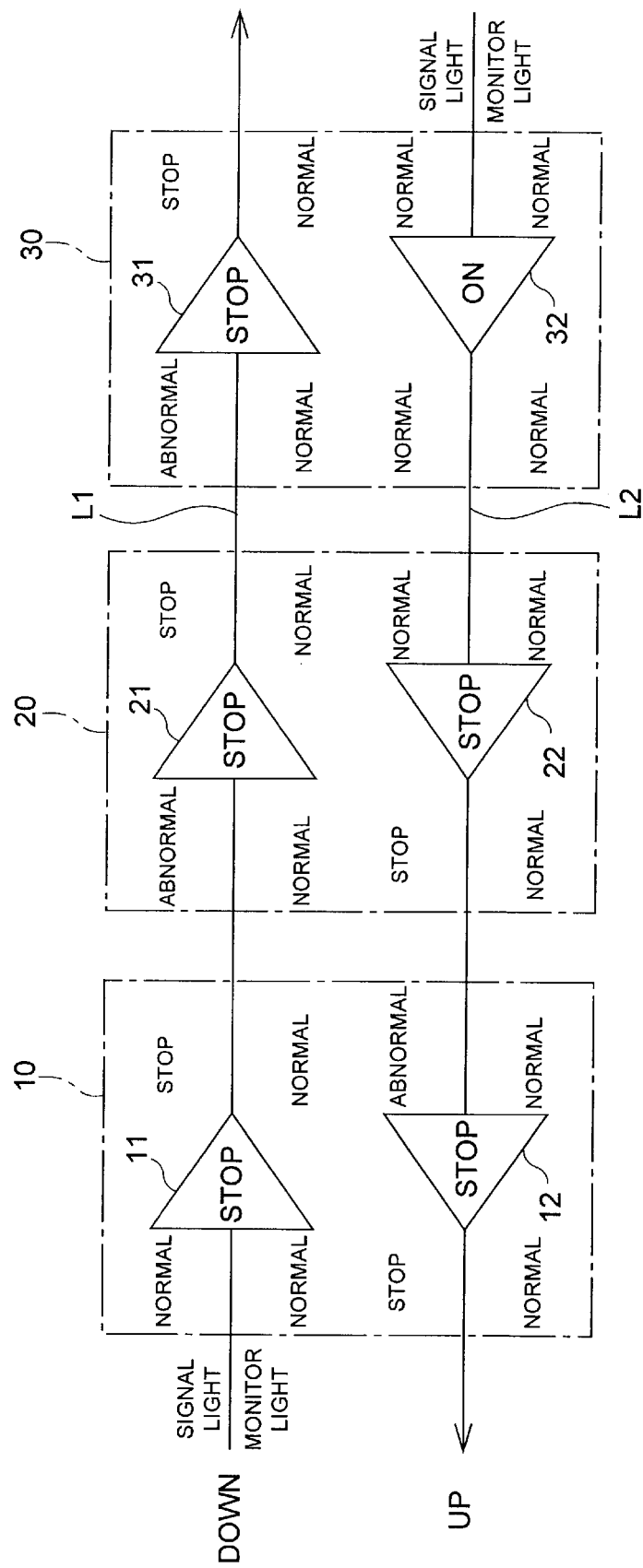

After the completion of the restoring operation, as shown in FIG. 5D, monitor light transmission between the repeater station 10 and the repeater station 20 through the transmission lines L1, L2 for both upstream and downstream directions is normally effected, whereby the monitor light transmission functions in both directions are restored immediately. This state is identical to that shown in FIG. 3E. After it is confirmed that the monitor light transmission functions on both sides are established, a command from the terminal station 1 or 2 reactivates the optical amplifiers 11 and 12, thereby allowing the transmission lines to be restored in the optical amplifier repeater system.

Next, restoring procedures in the case where a restoring operation is carried out without restoring the monitor light to normal from the state shown in FIG. 3C or 5B before the restoring operation will be explained with reference to FIGS. 6A to 6C. The restoring procedures are common to the case where only the optical transmission line for one direction is broken and the case where the optical transmission lines for both directions are broken.

The optical amplifier repeater system can be restored by successively carrying out the amplifying operation of the optical amplifier 11 in the repeater station 10 and the forcible transmission of the monitor light by the monitor light control apparatus 13, as well as the amplifying operation of the optical amplifier 22 in the repeater station 20 and the forcible transmission of the monitor light by the monitor light control apparatus 23.

Figure 6A:
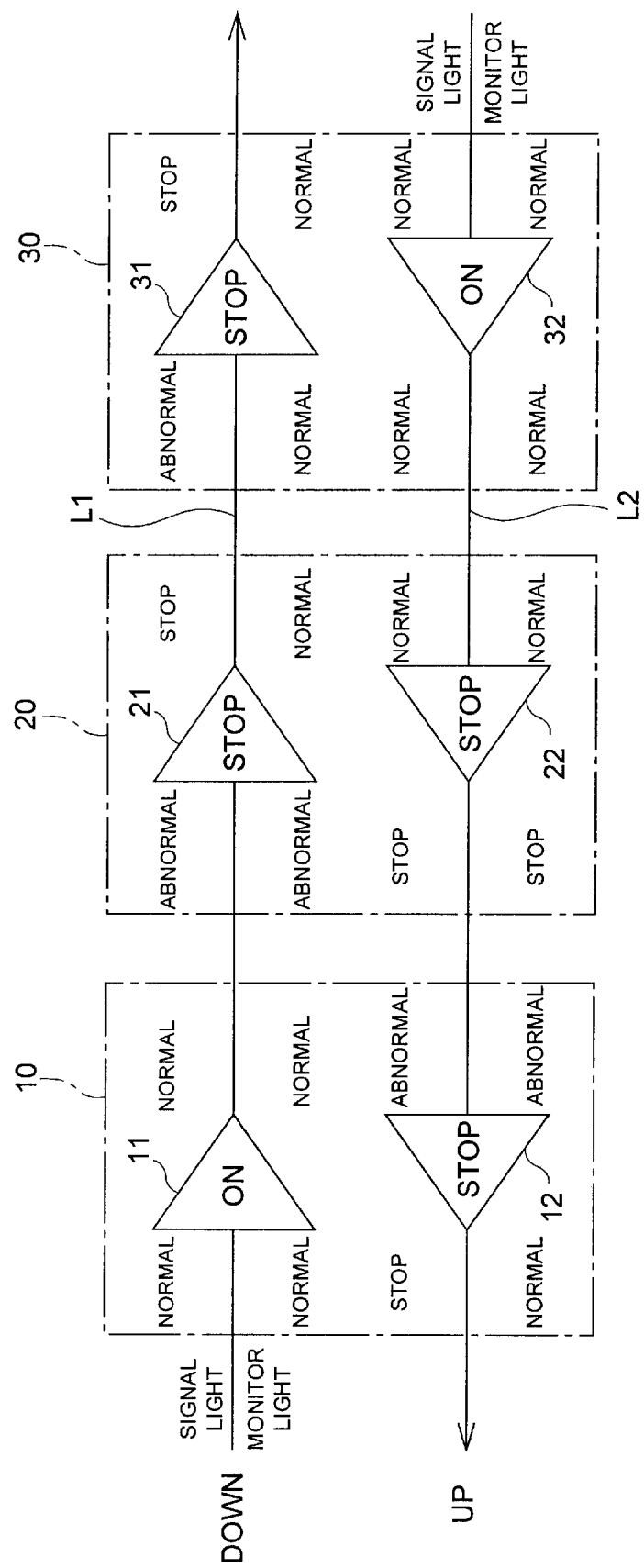
FIGS. 6A to 6C are views for successively explaining procedures for restoring the optical amplifier repeater system in the above-mentioned embodiment after the optical transmission lines are restored.
Figure 6B:
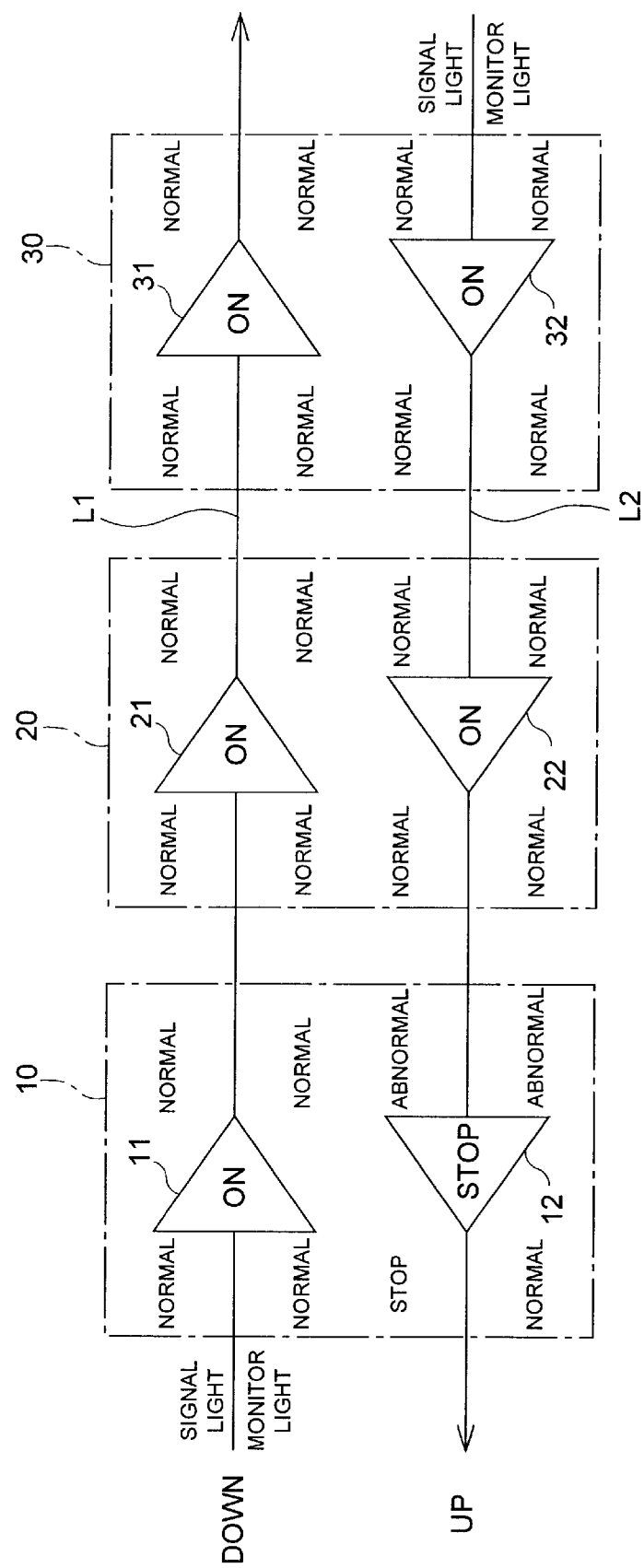
Figure 6C:
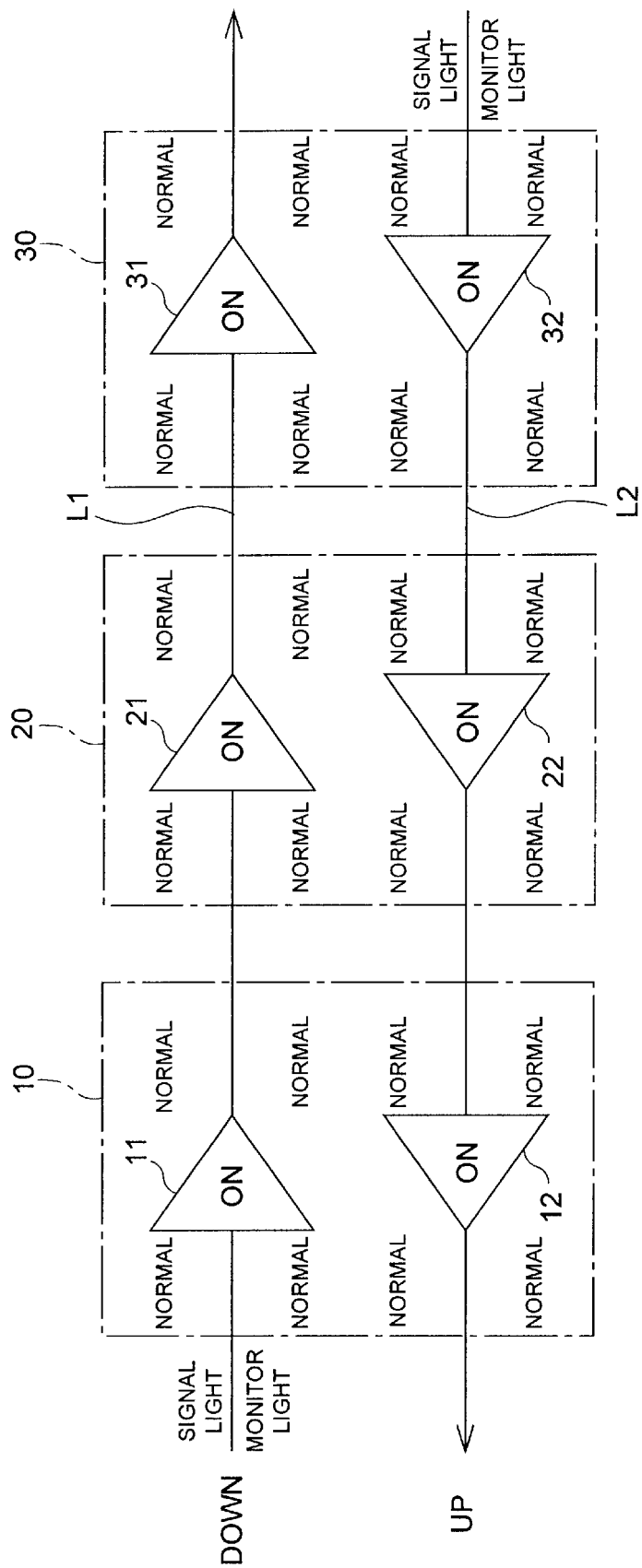

For example, as shown in FIG. 6A, the amplifying operation of the optical amplifier 11 in the repeater station 10 and the monitor light of the monitor control apparatus 13 are forcibly transmitted. Consequently, as shown in FIG. 6B, the signal light normally reaches the repeater station 20 from the repeater station 10, whereby the optical amplifier 21 in the repeater station 20 automatically resumes its amplifying operation. Further, the signal light normally reaches the repeater station 30 from the repeater station 20, whereby the optical amplifier 31 in the repeater station 30 automatically resumes its amplifying operation. The amplifying operation of the optical amplifier 21 in the repeater station 20 and the monitor light of the monitor control apparatus 23 are forcibly transmitted. Consequently, as shown in FIG. 6C, the signal light normally reaches the repeater station 10 from the repeater station 20, whereby the optical amplifier 12 in the repeater station 10 automatically resumes its amplifying operation. Thus, the optical amplifier repeater system is restored.

In the case where the monitor light is neither transmitted nor received, abnormalities in the respective signal light components fed into the two optical amplifiers are detected, and the respective operations of the two optical amplifiers are controlled according to the results of detection. Namely, one optical amplifier having sensed the abnormality in the signal light fed therein stops its amplifying operation by itself, and stops the other optical amplifier directly or by way of the monitor control apparatus.

Explained in the foregoing is an embodiment in which amplifying operations are automatically stopped when an abnormality is detected in transmission lines. In the case where the monitor light is transmitted and received, a configuration in which the result of detection is added to the monitor light as a signal and transmitted to the terminal stations 1, 2 may be employed. When the signal added to the monitor light is utilized, then it becomes easier to carry out an automatic restoring operation. In the following, this automatic restoring operation will be explained in each of the separate cases where one of the transmission lines is broken and where both of them are broken.

First, the case where one of the transmission lines is broken will be explained (the case where the downstream transmission line is broken will be explained here by way of example) with reference to FIGS. 7A to 7C and 8A to 8C. Assumed here is also a case where only the optical transmission line L1 in the downstream direction from the repeater station 10 to the repeater station 20 is broken at the point marked with X.

In this case, as shown in FIG. 7A, neither the signal light nor the monitor light reaches the repeater station 20 from the repeater station 10. Hence, the optical amplifier 21 in the repeater station 20 senses that the signal light fed therein is abnormal, stops its amplifying operation by itself, and notifies the monitor control apparatus 23 of this state. As a consequence, the signal light does not reach the repeater station 30 from the repeater station 20, whereas the monitor light reaches there normally. The optical amplifier 31 in the repeater station 30 senses that the signal light fed therein is abnormal, stops its amplifying operation by itself, and notifies the monitor control apparatus 33 of this state.

Figure 7B:
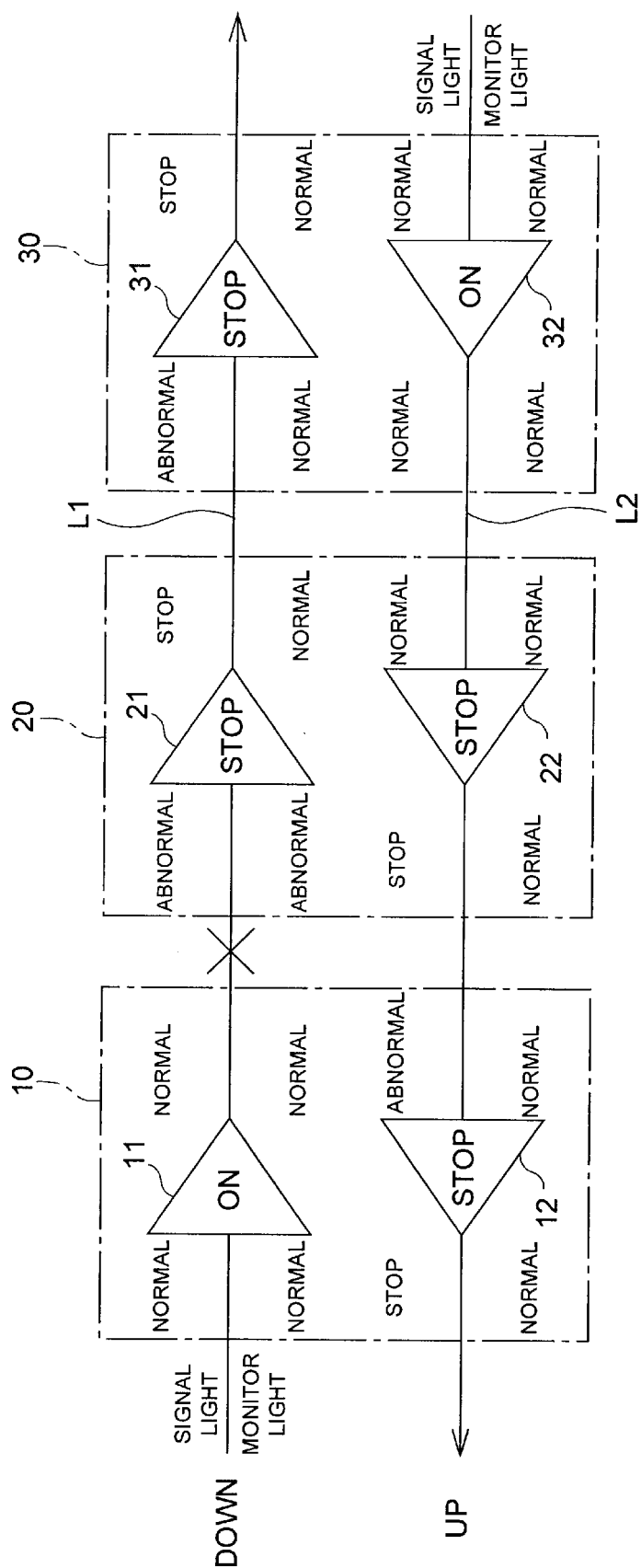

As shown in FIG. 7B, the monitor control apparatus 23 stops the optically-amplifying operation of the optical amplifier 22, determines that the transmission line fed into the optical amplifier 21 is abnormal, and transmits the monitor light additionally including the information indicative of the location where the abnormality has occurred to the monitor control apparatus 13 in the repeater station 10 by way of the transmission line L2. As a consequence, since the input signal light is stopped, the optical amplifier 12 also stops its amplifying operation.

Then, the monitor control apparatus 13 having received the monitor light signal additionally including the information indicative of the location where the abnormality has occurred stops the amplifying operation of the optical amplifier 11 as shown in FIG. 7C. As a consequence, the transmission of the optical signal to the broken portion is stopped.

In this state, the signal light is not transmitted through any of the optical transmission lines for both directions between the repeater station 10 and the repeater station 20, whereas the monitor light is kept being transmitted through the normal one of the lines.

Figure 8A:
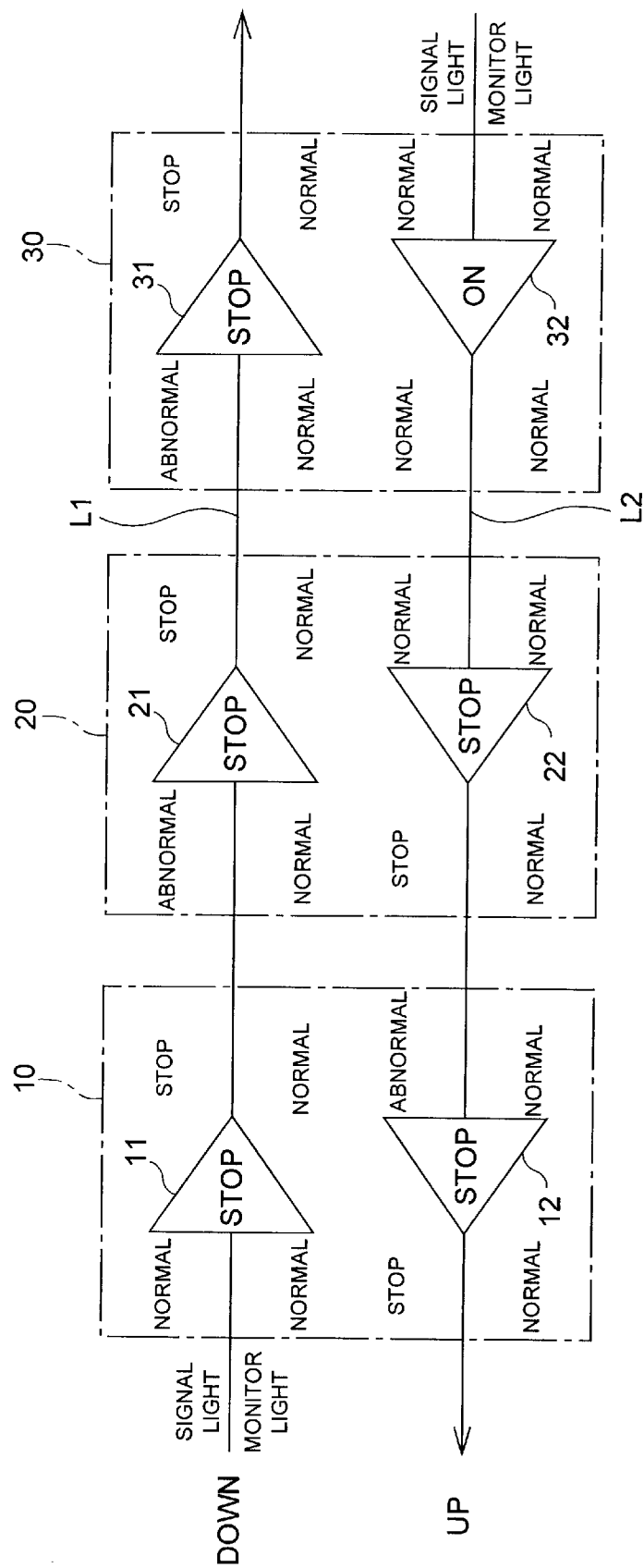
FIGS. 8A to 8C are views for successively explaining procedures for automatically restoring signal light transmission after the transmission line is restored.
Figure 8B:
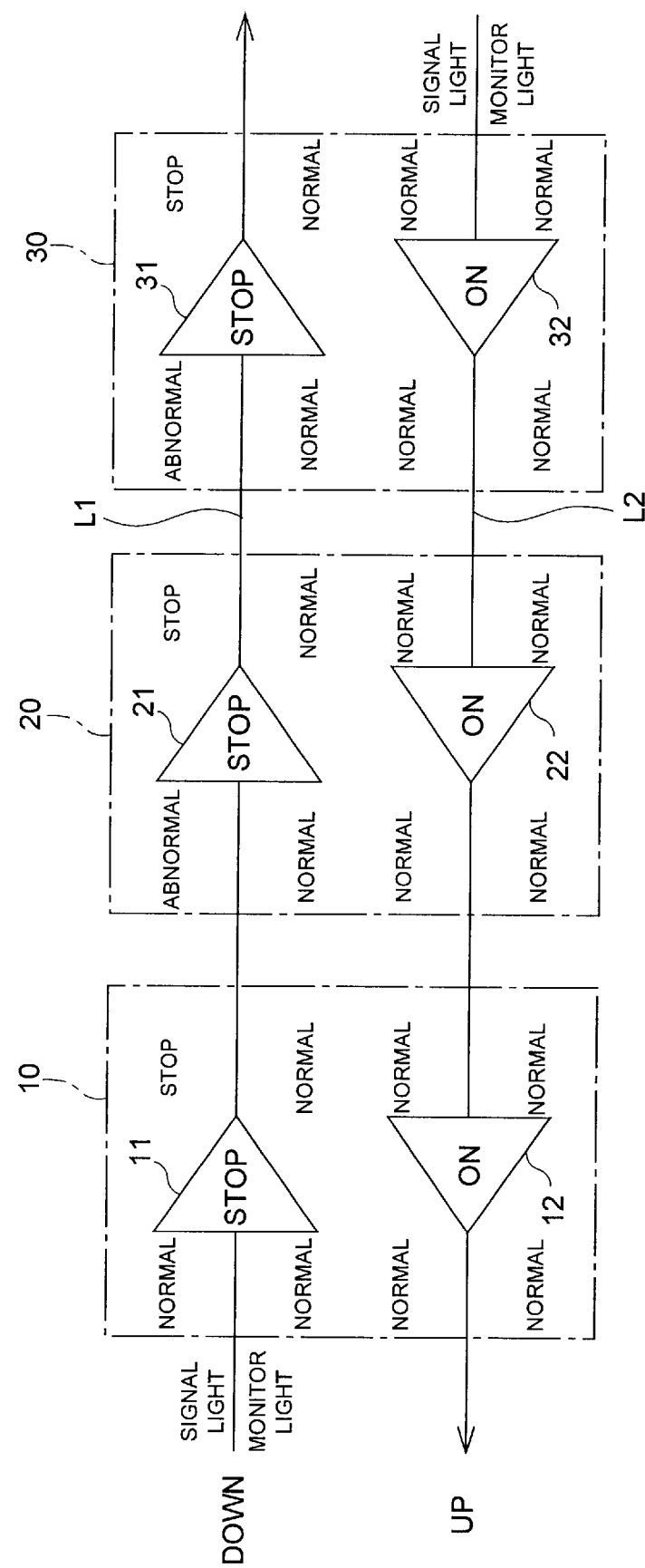

When the abnormality of the transmission line L1 is removed from this state, then the monitor light transmission functions in both transmission lines are automatically restored at first. When the normal monitor light signal is inputted from the transmission line that has been determined to be abnormal, the monitor control apparatus 23 in the repeater station 20 determines that the transmission line is restored, and stops adding the information indicative of this abnormal state to the monitor light (FIG. 8A). Here, since the monitor control apparatus 23 receives from the monitor control apparatus 13 the notification that the transmission line L2 is normal, it resumes the amplifying operation of the optical amplifier 22 as shown in FIG. 8B. Thus, the transmission function of the transmission line L2 is restored.

Figure 8C:
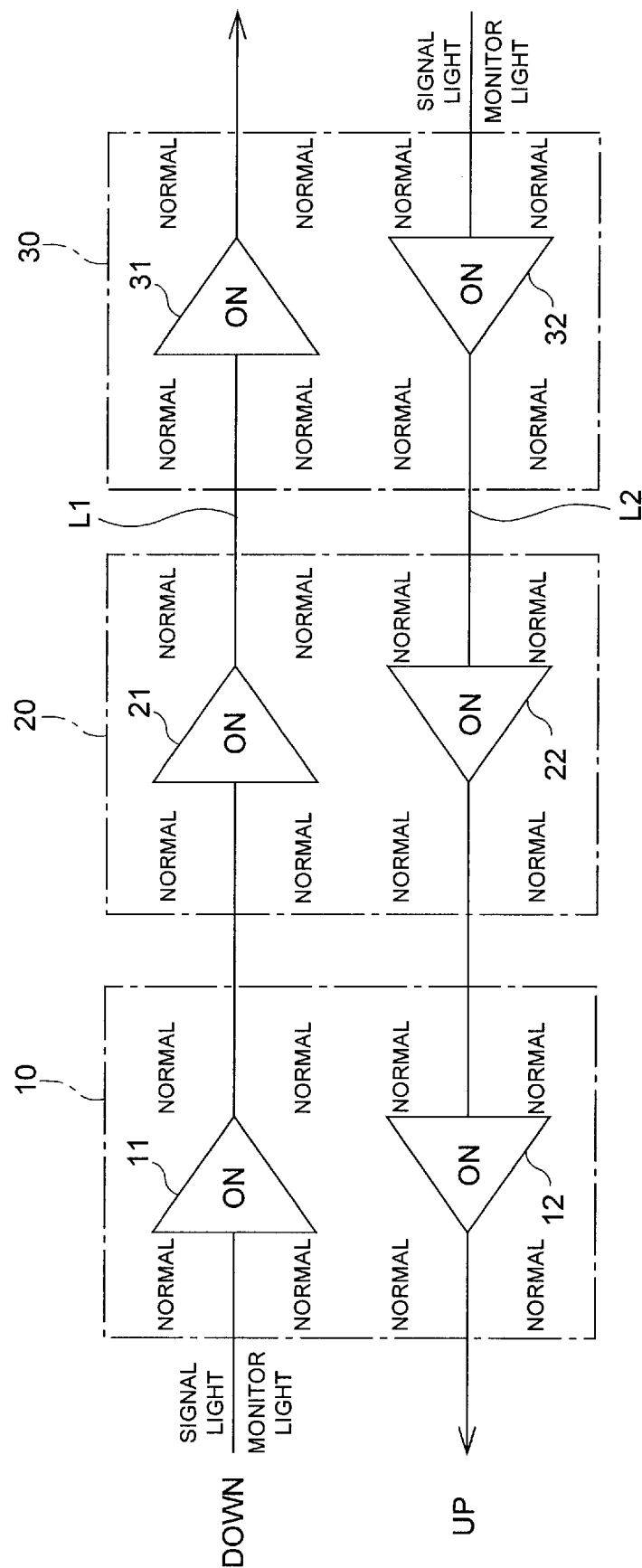

Since the monitor light signal sent from the monitor control apparatus 23 does not include the abnormal information added thereto, the monitor control apparatus 13 in the repeater station 10 determines that the transmission line is restored, and resumes the amplifying operation of the optical amplifier 12 as shown in FIG. 8C. As a consequence, the signal light transmission through the transmission line L1 is restored.

Thus, without any operation at terminal stations, the signal light transmission can be resumed after the transmission line is restored.

Next, automatic restoring operations in the case where both transmission lines are broken between the repeater station 10 and the repeater station 20 will be explained with reference to FIGS. 9A, 9B, and 10A to 10C.

Figure 9A:
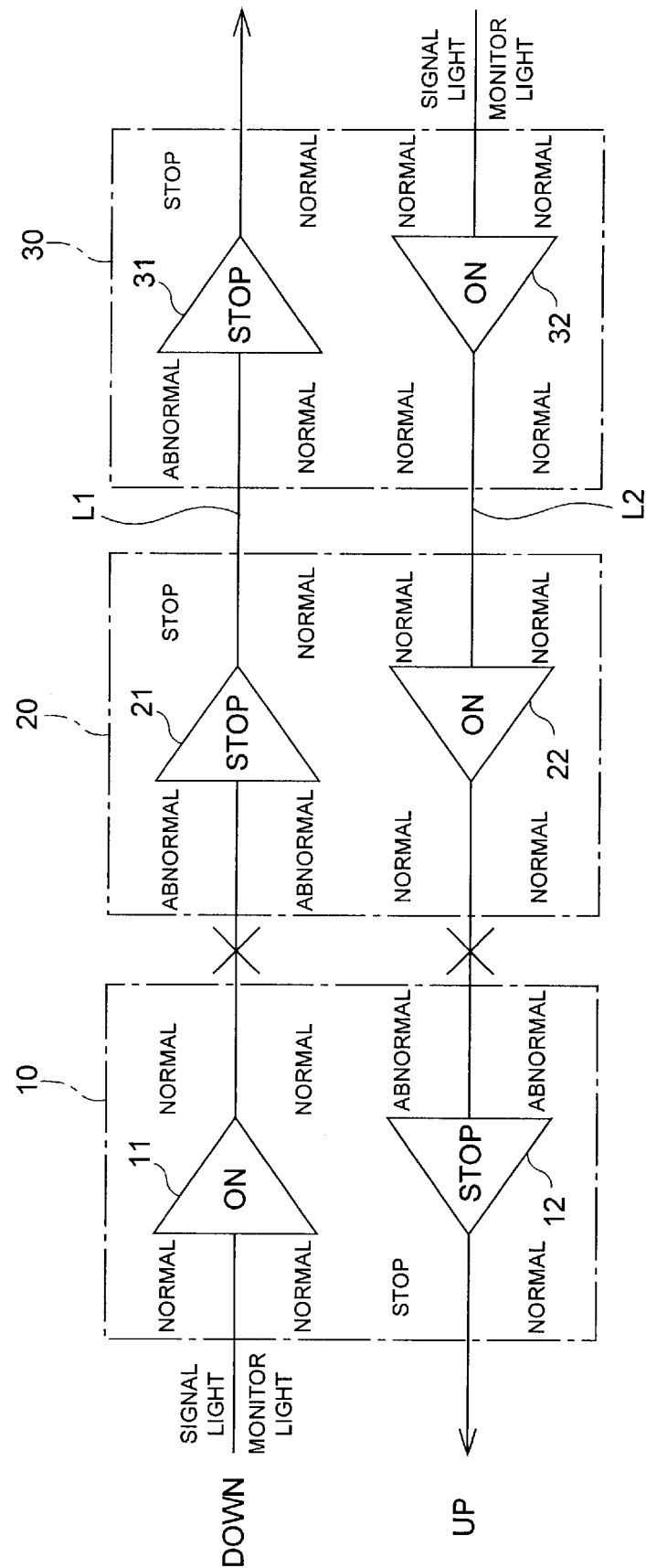

As shown in FIG. 9A, neither the signal light nor the monitor light arrives between the repeater station 10 and the repeater station 20. Therefore, the optical amplifier 12 in the repeater station 10 and the optical amplifier 21 in the repeater station 20 sense that the signal light fed therein is abnormal, stop their amplifying operations by themselves, and notify their respective monitor control apparatus 13, 23 of their states. As a consequence, no signal light is transmitted from the repeater station 20 to the repeater station 30. Since the monitor light arrives normally, the optical amplifier 31 in the repeater station 30 senses that the signal light fed therein is abnormal, stops its amplifying operation by itself, and notifies the monitor control apparatus 33 of this state.

Then, as shown in FIG. 9B, on the basis of the signals from the optical amplifiers 12, 21, the respective monitor control apparatus 13, 23 in the repeater stations 10, 20 stop the optically-amplifying operations of the optical amplifiers 11, 12 on the opposite side, add the signal indicative of abnormalities in the transmission lines to the monitor light, and transmit the resulting light. At this point of time, however, this monitor light is not transmitted between the repeater station 10 and the repeater station 20 due to the abnormalities in optical transmission lines.

Figure 10A:
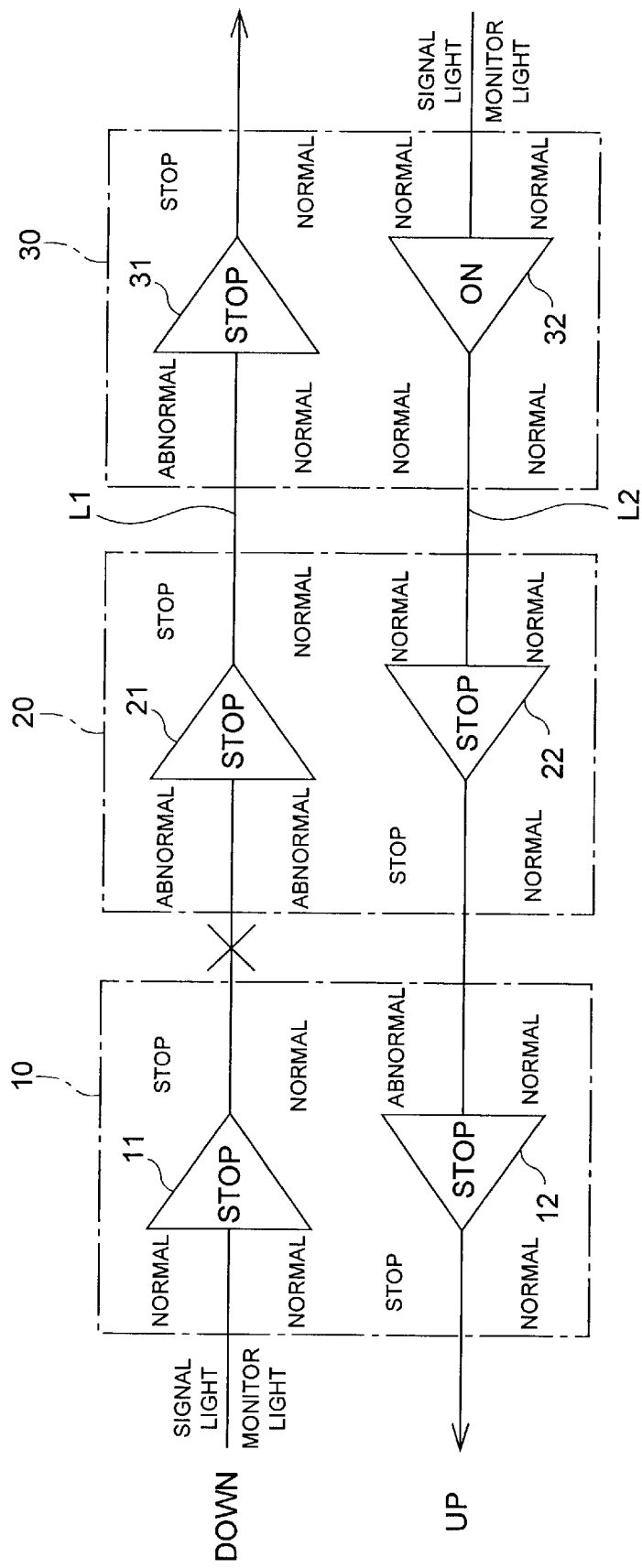
FIGS. 10A to 10C are views for successively explaining procedures for automatically restoring signal light transmission after the transmission lines are restored.
Figure 10B:
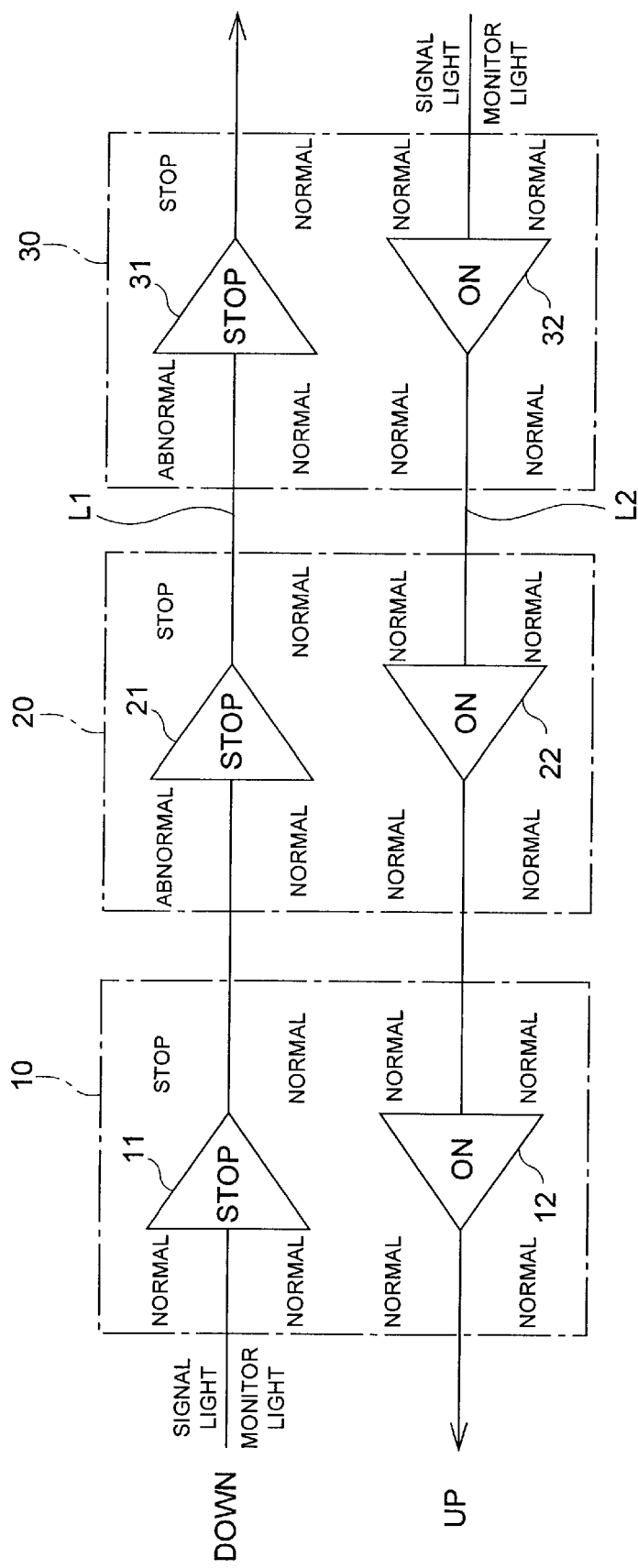
Figure 10C:
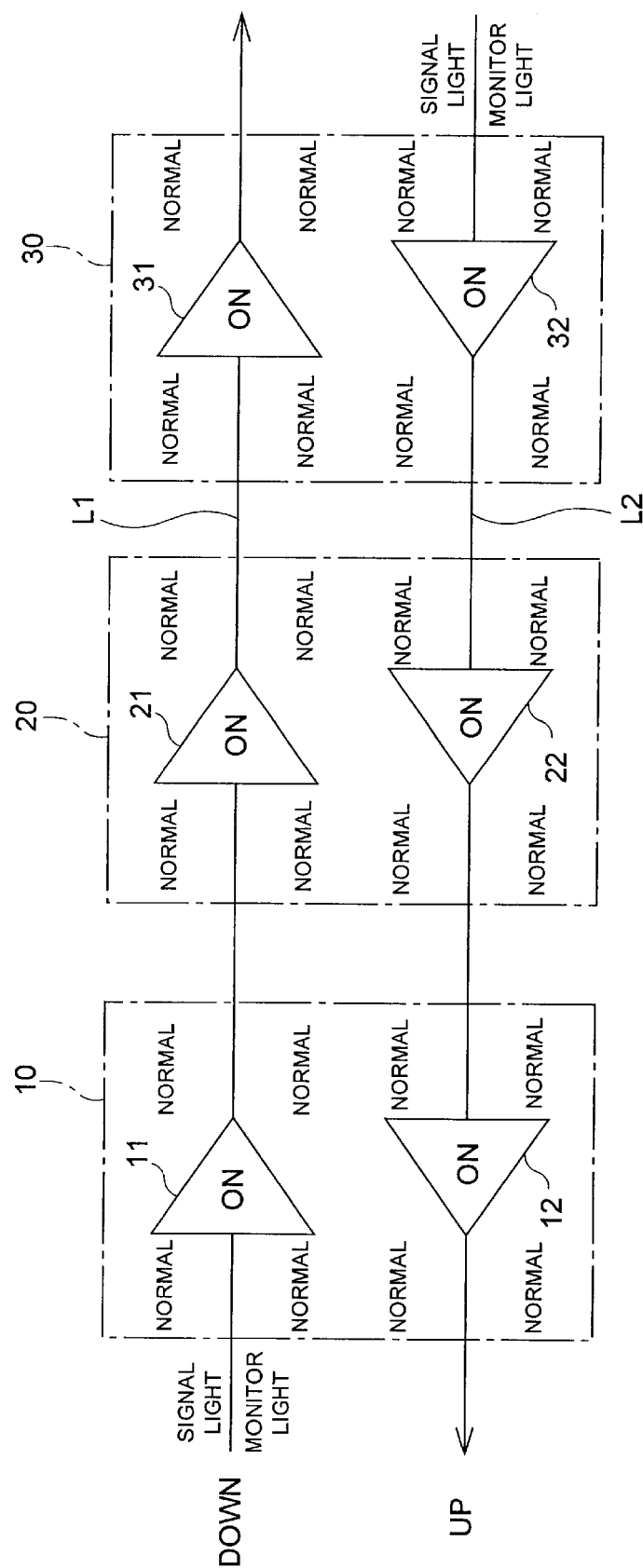

When the transmission line L2 is restored from this state at first, then the monitor light transmission function of the transmission line L2 is automatically restored as shown in FIG. 10A. Subsequently, when the transmission line L1 is restored as shown in FIG. 10B, then the monitor light indicative of the fact that the line L2 is restored is transmitted from the monitor control apparatus 13 to the monitor control apparatus 23 normally. Upon receiving it, the monitor control apparatus 23 resumes the amplifying operation of the optical amplifier 22. As a result, the downstream optical amplifier 12 also resumes its amplifying operation, whereby the signal light transmission function of the transmission line L2 is restored.

At the same time when the optical amplifier 22 resumes the amplifying operation, the monitor control apparatus 23 transmits the monitor light indicative of the fact that the transmission line L1 is restored. This monitor light is sent to the monitor control apparatus 13 through the transmission line L2. Upon receiving it, the monitor control apparatus 13 resumes the amplifying operation of the optical amplifier 11. As a result, the downstream optical amplifiers 21, 31 resume their amplifying operations, whereby the signal light transmission function of the transmission line L1 is restored. Thus, after the restoration of the transmission lines, the signal light transmission function can automatically be restored.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The present invention is favorably applicable to optical amplifier repeater systems in optical communications systems.

What is claimed is:

1. An optical amplifier repeater system comprising a pair of transmission lines and a plurality of repeater stations connected to each other in a multistage fashion, so as to bi-directionally transmit signal light between terminal stations, wherein each of said plurality of repeater stations comprises:

a pair of optical amplifiers, connected to said transmission lines corresponding thereto, for amplifying the signal light being transmitted; and a monitor apparatus for monitoring a state of the signal light fed into each of said optical amplifiers and stopping, when the signal light fed into one of said optical amplifiers is abnormal, an operation of said optical amplifiers is abnormal, an operation of said optical amplifier and then, after a lapse of a predetermined time, stopping an operation of an amplifier located upstream adjacent to a point where the abnormality has occurred on said transmission line by stopping an operation of the other of said optical amplifiers.

2. An optical amplifier repeater system comprising a pair of transmission lines and a plurality of repeater stations connected to each other in a multistage fashion, so as to bidirectionally transmit signal light between terminal stations, wherein each of said plurality of repeater stations comprises:
a pair of optical amplifiers, connected to said transmission lines corresponding thereto, for amplifying the signal light being transmitted; and
a monitor apparatus having:
a pair of monitor light receivers each receiving predetermined monitor light transmitted from an upstream adjacent repeater station or terminal station, and
a pair of monitor light transmitters each adding predetermined information to the monitor light received by said monitor light receivers and transmitting the resulting light to a downstream adjacent repeater station or terminal station;
said monitor apparatus monitoring states of the signal light and monitor light transmitted through each of said transmission lines and adding, when both of the signal light and monitor light transmitted through at least one of the transmission lines are abnormal, information indicative of an abnormal condition to the monitor light transmitted to the downstream side of both of the transmission lines.

3. An optical amplifier repeater system according to claim 2, wherein said monitor apparatus stops, when the signal light and monitor light transmitted through one of said transmission lines are abnormal, an operation of said optical amplifier connected to said transmission line, then stops the other of said optical amplifiers after a lapse of a predetermined time, and causes the monitor light outputted to the transmission line opposite to the transmission line in which the abnormality has occurred to be set to a state where the monitor apparatus in the downstream repeater station determines that the monitor light is abnormal.

4. An optical amplifier repeater system according to claim 3, wherein said monitor apparatus restores, after a lapse of a predetermined time since said monitor light has been set to the state where the monitor apparatus in the downstream repeater station determines that said monitor light is abnormal, said monitor light to a state where the monitor apparatus in the downstream repeater station determines that said monitor light is normal.

5. An optical amplifier repeater system according to claim 2, wherein the state where the monitor apparatus in the downstream repeater station determines that said monitor light is abnormal is a state where there is no output of said monitor light.

6. An optical amplifier repeater system according to claim 2, wherein, when both of the signal light and monitor light transmitted through one of said transmission lines are abnormal, said monitor apparatus stops an operation of said optical amplifier connected to said transmission line, then stops an operation of the other of said optical amplifiers after a lapse of a predetermined time, adds information capable of specifying the optical amplifier into which abnormal signal light is fed to the monitor light outputted to the transmission line opposite to the transmission line in which an abnormality has occurred, and transmits the resulting light; and wherein said monitor apparatus in a repeater station or terminal station having received said information-added monitor light stops an operation of the optical amplifier connected to the upstream side of a point where the abnormality has occurred.

7. An optical amplifier repeater system according to claim 6, wherein, when the monitor light in said transmission line in which the abnormal signal light is transmitted is restored to normal, said monitor apparatus restores an operation of the optical amplifier connected to the transmission line pairing with said former transmission line, and adds information for restoring an operation of the optical amplifier upstream of the point where the abnormality has occurred to the monitor light outputted to said pairing transmission line.

8. An optical amplifier repeater system comprising a pair of transmission lines and a plurality of repeater stations connected to each other in a multistage fashion, so as to bidirectionally transmit signal light from terminal stations, wherein each of said plurality of repeater stations comprises:
a pair of optical amplifiers, connected to said transmission lines corresponding thereto, for amplifying the signal light being transmitted; and
a monitor apparatus having:
a pair of monitor light receivers each receiving predetermined monitor light transmitted from an upstream adjacent repeater station or terminal station, and
a pair of monitor light transmitters each adding predetermined information to the monitor light received by said monitor light receivers and transmitting the resulting light to a downstream adjacent repeater station or terminal station;
said monitor apparatus monitoring states of the signal light and monitor light transmitted through each of said transmission lines, stopping, when both of the signal light and monitor light transmitted through said transmission line are abnormal, an operation of said optical amplifier connected to said transmission line, then stopping an operation of the other of said optical amplifiers after a lapse of a predetermined time, adding information capable of specifying the optical amplifier into which abnormal signal light is fed to the monitor light outputted to the downstream side of both of said transmission lines, and transmitting the resulting light; said monitor apparatus stopping, when receiving said information-added monitor light, an operation of said optical amplifier connected to the upstream side of a point where an abnormality has occurred; said monitor apparatus restoring, when the monitor light in said transmission line in which the abnormal signal light is transmitted is restored to normal, the optical amplifier connected to the transmission line pairing with said former transmission line, and adding information for restoring an operation of the optical amplifier upstream of the point where the abnormality has occurred to the monitor light outputted to said pairing transmission line.

9. An optical amplifier repeater system according to claim 3, wherein the state where the monitor apparatus in the downstream repeater station determines that said monitor light is abnormal is a state where there is no output of said monitor light.

10. An optical amplifier repeater system according to claim 4, wherein the state where the monitor apparatus in the downstream repeater station determines that said monitor light is abnormal is a state where there is no output of said monitor light.

* * * * *